US010055742B2

(12) United States Patent
Phelps et al.

(10) Patent No.: US 10,055,742 B2
(45) Date of Patent: Aug. 21, 2018

(54) CALL TRANSFERS FOR WEB-DELIVERED CALLS

(71) Applicant: Verizon Patent and Licensing Inc., Basking Ridge, NJ (US)

(72) Inventors: David E. Phelps, Colorado Springs, CO (US); Brian S. Badger, Divide, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1005 days.

(21) Appl. No.: 13/894,832

(22) Filed: May 15, 2013

(65) Prior Publication Data
US 2014/0344169 A1 Nov. 20, 2014

(51) Int. Cl.
*G06Q 10/10* (2012.01)
*G06Q 30/00* (2012.01)

(52) U.S. Cl.
CPC .................................. *G06Q 30/016* (2013.01)

(58) Field of Classification Search
USPC .......................................................... 705/304
See application file for complete search history.

(56) References Cited

U.S. PATENT DOCUMENTS

| 6,882,641 B1* | 4/2005 | Gallick | H04M 3/5191 |
| | | | 370/252 |
| 8,695,077 B1* | 4/2014 | Gerhard | H04L 63/0815 |
| | | | 726/8 |
| 2004/0174979 A1* | 9/2004 | Hutton | H04M 3/5166 |
| | | | 379/265.02 |
| 2007/0168472 A1* | 7/2007 | Walter | H04M 1/2471 |
| | | | 709/220 |
| 2008/0144800 A1* | 6/2008 | Donnelly | H04M 3/42161 |
| | | | 379/265.02 |
| 2014/0126713 A1* | 5/2014 | Ristock | H04M 3/5231 |
| | | | 379/265.09 |
| 2014/0126714 A1* | 5/2014 | Sayko | H04M 3/5191 |
| | | | 379/265.09 |
| 2014/0126715 A1* | 5/2014 | Lum | H04M 3/5133 |
| | | | 379/265.09 |

(Continued)

OTHER PUBLICATIONS

"WebRTC Will Deliver a Seamless Customer Experience" Bernier, Paula. Customer; Norwalk vol. 31, Iss. 8, (May 2013): 24-25. (Year: 2013).*

*Primary Examiner* — Andrew B Whitaker

(57) ABSTRACT

A system may include a contact center services system configured to connect a Web Real-Time Communication (WebRTC) call to a first contact center agent and a server device configured to provide a first interface to the first contact center agent; receive a transfer request from the first contact center agent via the first interface; and send an instruction, to the contact center services system, to transfer the WebRTC call to a second contact center agent, in response to receiving the transfer request. The contact center services system may connect the WebRTC call with the second contact center agent based on the received instruction and may provide, to the server device, an indication that the connection with the second contact center agent has been made. The server device may provide a second agent interface to the second contact center agent, in response to receiving the indication.

18 Claims, 15 Drawing Sheets

(56) References Cited

U.S. PATENT DOCUMENTS

| | | | | |
|---|---|---|---|---|
| 2014/0140494 A1* | 5/2014 | Zhakov | ............... | H04M 3/5175 |
| | | | | 379/265.03 |
| 2014/0211933 A1* | 7/2014 | Vymenets | ........... | H04M 3/5183 |
| | | | | 379/265.06 |
| 2014/0324979 A1* | 10/2014 | Gao | ........................ | G06F 17/00 |
| | | | | 709/204 |
| 2014/0344913 A1* | 11/2014 | Stahl | ................... | H04L 12/1403 |
| | | | | 726/11 |

* cited by examiner

US 10,055,742 B2

CALL TRANSFERS FOR WEB-DELIVERED CALLS

BACKGROUND INFORMATION

Various technologies exist for the delivery of voice communication over a network. For example, a provider of voice communication services may manage a network that may enable users to communicate via voice and/or video calls. A user may participate in voice communication by using a dedicated device, such as a telephone, or by using software dedicated for voice communication, such as Voice over Internet Protocol (VoIP) software. A common tool for accessing, processing, and navigating information on the Internet is a browser application. In order to enable voice and video communication in browser applications, an application programming interface (API), referred to as Web Real-Time Communication (WebRTC), has been developed. The provider of voice communication services may need to integrate WebRTC functionality into an existing infrastructure.

DETAILED DESCRIPTION OF PREFERRED EMBODIMENTS

Figure 1:
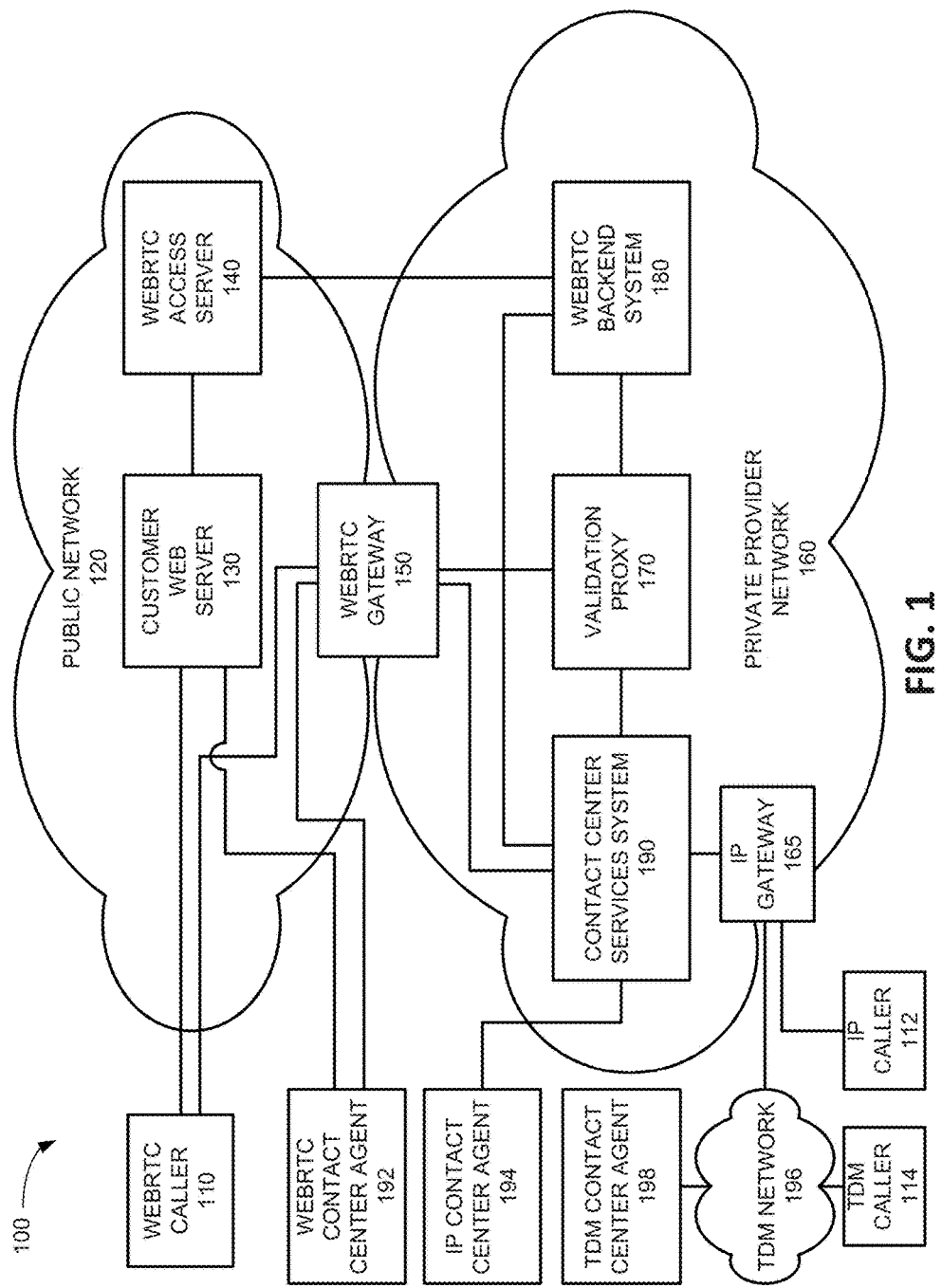
FIG. 1 is a diagram illustrating an exemplary environment according to an implementation described herein.

The following detailed description refers to the accompanying drawings. The same reference numbers in different drawings identify the same or similar elements.

Implementations described herein relate to call control for Web calls. A Web call may be initiated by a user by using a browser application (e.g., Mozilla Firefox, Microsoft Explorer, Google Chrome, Apple Safari, etc.) configured with Web Real-Time Communication (WebRTC) capability. A WebRTC enabled browser application may include a Web Application Programming Interface (API) that may interface with an audio and/or video application enabled for real-time communication. The Web API may interface with a WebRTC API. The WebRTC API may make use of real-time communication protocols (e.g., Extensible Messaging and Presence Protocol (XMPP), Real Time Protocol (RTP), Interactive Connectivity Establishment (ICE), Session Traversal Utilities for Network Address Translation (STUN), etc.) that may manage real-time connections with other devices across a network.

A company may enable users to initiate a WebRTC call via a web page accessible to a user. For example, a user may access the company's web page and may click on a button to activate a phone call to a customer representative. In response to clicking the button, the browser application may initiate a WebRTC call to a customer representative. While the company may enable direct connection of the WebRTC call from the user's browser application to the customer representative, such a direct connection may pose a number of problems. For example, providing a direct WebRTC connection to a customer representative may leave the company's web site vulnerable to a denial-of-service (DOS) event. If a large number of users click on the button within a particular time period, a network and/or phone system that handles customer service calls may be overwhelmed.

A DOS event may be prevented by using an authorization interface on a public server. For example, a caller connecting to a WebRTC gateway may be required to provide an account number and/or a password, and the WebRTC gateway may communicate with an authorization server (e.g., an OpenID server, an OAuth Server, a Diameter server, etc.) to validate the account number and password. However, a caller, such as a toll-free customer, may not have an account number and/or password and thus authorization of the caller may not be available. Rather, authorization may need to be performed on the called party, such as the company associated with a toll-free number.

As another example, the phone system that handles customer service calls may be hosted in a private network of a telephone services provider as a contact center services system. The company may pay for use of the contact center services system and may be charged for phone calls handled by the contact center services system. For example, a user may dial a toll-free number to speak with a customer representative, may be connected to the contact center services system, and the provider may charge the company for the telephone call. Thus, the provider may need to enable users to reach the contact center services system via WebRTC from a browser application and may need to determine how to charge the company for the telephone call.

Furthermore, once a WebRTC call is connected to a contact center services system, the company may need to be able to control the WebRTC call and/or to transfer the WebRTC call from a first contact center agent to a second contact center agent. Implementations described herein relate to a system that includes a contact center services system configured to communicate with a customer web server and coordinate transfer of a call from a first contact center agent to a second contact center agent.

The contact center services system may connect a call to a first contact center agent. The call may be a WebRTC call, a Voice over Internet Protocol (VoIP) call, a Time Division Multiplexing (TDM) call, and/or another type of call. The connection from the contact center services system to the first contact center agent may correspond to a WebRTC connection, a VoIP connection, a TDM connection, and/or another type of connection. The contact center services system may send an indication to a customer web server that a connection has been made to the first contact center agent and the customer web server may provide an interface to the first contact center agent. The interface may include information about the call and/or information about the caller and may provide the first contact center agent with options to transfer the call to another contact center agent.

The first contact center agent may send a transfer request to the customer web server using the interface and the customer web server may send an instruction to the contact center services system to transfer the call to a second contact center agent. The second contact center agent may be configured for a WebRTC connection, a VoIP connection, a TDM connection, and/or another type of connection. The contact center services system may connect the call with the second contact center agent using the WebRTC connection, the VoIP connection, the TDM connection, and/or the other type of connection and may send an indication to the customer web server that the connection has been made. The customer web server may then provide an interface to the second contact agent. Communication between the contact center services system and the customer web server may be performed via a WebRTC access server, located in a public network, and a WebRTC backend system, located in a private provider network.

A "customer," as the term is used herein, may refer to a customer, such as a company or a corporate client, of a provider of communication services. The provider of communication services may manage a private network that may host communication services, such as a contact center, for the customer. Implementations described herein relate to a system that prevents WebRTC denial-of-service events for a customer, that enables a customer to incorporate handling of WebRTC calls into a contact center hosted in the provider's private network, that enables the provider to track and bill WebRTC calls, and/or that enables the passing of call session data from a customer server to a contact center via a WebRTC call.

FIG. 1 is a diagram of an exemplary environment 100 in which the systems and/or methods described herein may be implemented. As shown in FIG. 1, environment 100 may include a WebRTC caller 110, an IP caller 112, a TDM caller 114, a public network 120, a private provider network 160, a WebRTC contact center agent 192, an IP contact center agent 194, a TDM network 196, and a TDM contact center agent 198.

WebRTC caller 110 may include any device with a browser application configured with WebRTC functionality. IP caller 112 may include any device configured with VoIP functionality, such as a VoIP application. TDM caller 114 may include any device configured for TDM telephone calls, such as a device configured for $2^{nd}$ generation or $1^{st}$ generation wireless telephone technology and/or circuit-based landline telephone technology. For example, WebRTC caller 110, IP caller 112, and/or TDM caller 114 may include a portable communication device (e.g. a mobile phone, a smart phone, a tablet computer, a global positioning system (GPS) device, and/or another type of wireless device); a personal computer or workstation; a server device; a portable computer; a television, a projector, a speaker, or another type of a display or audio output device; a set-top box; a gaming system; and/or any type of device with communication capability.

Public network 120 may include one or more circuit-switched networks and/or packet-switched networks. Public network 120 may include a local area network (LAN), a wide area network (WAN), a metropolitan area network (MAN), an ad hoc network, an intranet, the Internet, a fiber optic-based network, a wireless network, and/or any combination of these or other types of networks. Public network 120 may include a customer web server 130, a WebRTC access server 140, and a WebRTC gateway 150.

Customer web server 130 may include one or more computer devices, such as server devices, which host a web site associated with the customer. For example, customer web server 130 may include a web page with a WebRTC selection object, such as a call button, to enable a user to request to talk to a contact center agent. When a WebRTC call is requested by a browser application, in response to a user of WebRTC caller 110 pressing the call button, customer web server 130 may request a Uniform Resource Identifier (URI) from WebRTC access server 140 and provide the URI to the browser application. The URI may direct the browser application to a contact center via WebRTC gateway 150. Moreover, the request may include call session data that may be used by private provider network 160 to process the WebRTC call.

Furthermore, customer web server 130 may perform control actions with respect to a WebRTC call. For example, customer web server 130 may select to a control action to play a particular message to a caller associated with the Web Real-Time communication call; a control action to park the Web Real-Time communication call; a control action to provide an estimated wait time to the caller; a control action to obtain particular information from the caller; a control action to initiate a callback; a control action to transfer the Web Real-Time communication call to a selected contact center agent; a control action to send the Web Real-Time communication call to a particular entry point in an interactive voice response flow; and/or another type of control action. The control action may be sent to a contact center services system in private provider network 160 via WebRTC access server 140.

Additionally, customer web server 130 may receive an indication from a contact center services system that a call has been connected to a contact center agent, such as WebRTC contact center agent 192, IP contact center agent 194, TDM contact center agent 198, and/or another type of contact center agent, and may, in response, provide an agent interface to the contact center agent. Furthermore, customer web server 130 may manage transfer of the call from the contact center agent to another contact center agent by instructing the contact center services system to perform the transfer.

WebRTC access server 140 may include one or more computer devices, such as server devices, which enable customer web server 130 to communicate with a WebRTC backend system. For example, WebRTC access server 140 may receive an instruction to perform a control action, such as a call transfer, for a particular WebRTC call, may authenticate customer web server 130, and may forward the instruction to perform the control action to a WebRTC backend system. Furthermore, WebRTC access server 140 may receive a response to the instruction to perform the control action, and/or may receive a report message, from the WebRTC backend system, and may forward the response, and/or the report message, to customer web server 130.

WebRTC gateway 150 may include one or more network devices that function as a gateway for provider network 160 with respect to WebRTC calls. For example, WebRTC gateway 150 may route WebRTC calls from public network 120 to private provider network 160 and may route calls from private provider network 160 to public network 120. WebRTC gateway 150 may convert an incoming WebRTC call to a Session Initiation Protocol (SIP) call, or to another type of call that is used within private provider network 160. Furthermore, WebRTC gateway 150 may convert an outgoing SIP call, or another type of call used within private provider network 160, into a WebRTC call in public network 120. WebRTC gateway 150 may apply one or more filter rules to determine whether a particular WebRTC call connection should be allowed into private provider network 160.

Private provider network 160 may include a private circuit-switched network and/or packet-switched network. Private provider network 160 may include a local area network (LAN), a wide area network (WAN), a metropolitan area network (MAN), an ad hoc network, an intranet, a fiber optic-based network, a wireless network, and/or any combination of these or other types of networks. Private provider network 160 may include an IP gateway 165, a validation proxy 170, a WebRTC backend system 180, and a contact center services system 190.

IP gateway 165 may function as an IP gateway to private provider network 160 for IP caller 112 and/or may interface with TDM network 196. Validation proxy 170 may validate WebRTC URIs received from WebRTC gateway 150. For example, WebRTC gateway 150 may forward a WebRTC URI to validation proxy 170, validation proxy may send the WebRTC URI to WebRTC backend system 180, and may receive a validation message from WebRTC backend system 180. The validation message may include call session data and validation proxy 170 may add the call session data to the WebRTC call.

WebRTC backend system 180 may generate WebRTC URIs for WebRTC calls associated with private provider network 160 and may validate generated WebRTC URIs. WebRTC backend system 180 may interface with customer web servers 130 via WebRTC access server 140. WebRTC backend system 180 may receive a request for a WebRTC URI from customer web server 130 via WebRTC access server 140, may generate the WebRTC URI, and may forward the generated WebRTC URI to customer web server 130 via WebRTC access server 140. The generated WebRTC URI may, for example, direct a browser application running on WebRTC caller 110 to contact center services system 190. Furthermore, WebRTC backend system 180 may retrieve call session data from the received request, such as information identifying a caller, information relating to the caller, a reason for the call, etc. The retrieved call session data may be stored in connection with the generated WebRTC URI.

Still further, WebRTC backend system 180 may validate the generated WebRTC URI at a later time based on a request received from validation proxy 180. For example, WebRTC backend system 180 may determine whether the generated WebRTC URI is valid. A WebRTC URI may be valid when the WebRTC URI corresponds to a previously generated WebRTC URI and/or when the WebRTC URI satisfies one or more criteria, such as not being expired and not having been previously validated. WebRTC backend system 180 may generate a validation message in response to determining that the WebRTC URI is valid and may include any stored call session data in the validation message.

Moreover, WebRTC backend system 180 may be configured to enable communication between contact center services system 190 and customer web server 130 via WebRTC access server 130. As an example, WebRTC backend system 180 may receive an instruction to perform a control action, such as to perform a call transfer from a first contact center agent to a second contact center agent for a particular WebRTC call being processed by contact center services system 190, from customer web server 130 and may forward the instruction to perform the control action to contact center services system 190. As another example, WebRTC backend system 180 may receive a response to the instruction to perform the control action, and/or may receive a report message, from contact center services system 190 and may forward the response to the control action, and/or the report message, to customer web server 130 via WebRTC access server 140.

Contact center services system 190 may host contact center services for one or more customers of private provider network 160. For example, contact center services system 190 may include an Interactive Voice Response (IVR) platform, with or without Automatic Speech Recognition (ASR), which may request information from a caller and may direct the caller to a particular destination. Contact center services system 190 may run multiple instance of a platform, wherein each instance is associated with a particular customer. Different customers may be associated with different types, versions, subscriptions, and/or options configured for instances of contact center services system 190.

For example, contact center services system 190 may prompt the user to make one or more selections relating to the user's reason for calling or may prompt the user to provide identifying information. Alternatively, some or all of the information may be obtained by customer web server 130 and passed to contact center services system 190 as call session data included in the WebRTC call. Contact center services system 190 may perform one or more actions after obtaining information relating to the WebRTC call. For example, contact center services system 190 may park the call while a contact center agent is selected or made available, may direct the user to a voicemail system where the user can leave a message, and/or may connect the user to a contact center agent.

Furthermore, in some implementations, contact center services system 190 may generate a URI for an existing WebRTC call and may provide the generated URI to customer web server 130 via WebRTC backend system 180. The generated URI may be used to identify the WebRTC call and may be used to associate control actions, generated by customer web server 130, with the WebRTC call. Customer center services system 190 may receive an instruction to perform a control action from customer web server 130 via WebRTC backend system 180, may retrieve a URI from the received instruction, may identify a particular WebRTC call based on the retrieved the URI, and may perform the control action with respect to the identified WebRTC call based on the received instruction. Contact center services system 190 may send a response message back to customer web server 130, via WebRTC backend system 180, after the control action has been executed. Furthermore, contact center services system 190 may send a report message, associated with a particular WebRTC call, to customer web server 130 via WebRTC backend system 180.

Contact center services system 190 may be configured to communicate with contact center agents, such as WebRTC contact center agent 192, IP contact center agent 194, TDM contact center agent 198, and/or other types of contact center agents. WebRTC contact center agent 192 may include any device with a browser application configured with WebRTC functionality. IP contact center agent 194 may include any device configured with VoIP functionality, such as a VoIP application. TDM network 196 may include a TDM network, such as a $2^{nd}$ generation or $1^{st}$ generation wireless network, a circuit-based legacy telephone network, and/or another type of TDM network. TDM contact center agent 198 may include any device configured for placing and/or receiving TDM telephone calls using TDM network 196.

WebRTC contact center agent 192, IP contact center agent 194, and/or TDM contact center agent 198 may include a portable communication device (e.g. a mobile phone, a smart phone, a tablet computer, a global positioning system (GPS) device, and/or another type of wireless device); a personal computer or workstation; a server device; a portable computer; and/or any other type of device with communication capability.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

For example, while FIG. 1 shows a single WebRTC caller 110, a single IP caller 112, a single TDM caller 114, a single customer web server 130, a single WebRTC access server 140, a single WebRTC gateway 150, a single IP gateway 165, a single validation proxy 170, a single WebRTC backend system 180, a single contact center services system 190, a single WebRTC contact center agent 192, a single IP contact center agent 194, a single TDM network 196, a single TDM contact center agent 198 for illustrative purposes, in practice, environment 100 may include multiple WebRTC callers 110, multiple IP callers 112, multiple TDM callers 114, multiple customer web servers 130, multiple WebRTC access servers 140, multiple WebRTC gateways 150, multiple IP gateways 165, multiple validation proxies 170, multiple WebRTC backend systems 180, multiple contact center services systems 190, multiple WebRTC contact center agents 192, multiple IP contact center agents 194, multiple TDM networks 196, and/or multiple TDM contact center agents 198.

Figure 2:
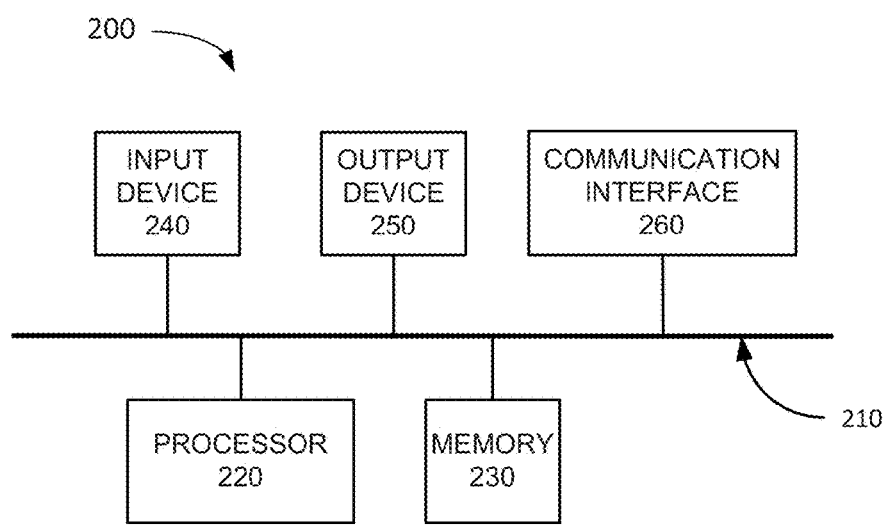
FIG. 2 is a diagram illustrating exemplary components of a device that may be included in one or more components of FIG. 1.

FIG. 2 is a diagram illustrating exemplary components of a device 200 according to an implementation described herein. WebRTC caller 110, IP caller 112, TDM caller 114, customer web server 130, WebRTC access server 140, WebRTC gateway 150, IP gateway 165, validation proxy 170, WebRTC backend system 180, contact center services system 190, WebRTC contact center agent 192, IP contact center agent 194, and/or TDM contact center agent 198 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to processing of WebRTC calls. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
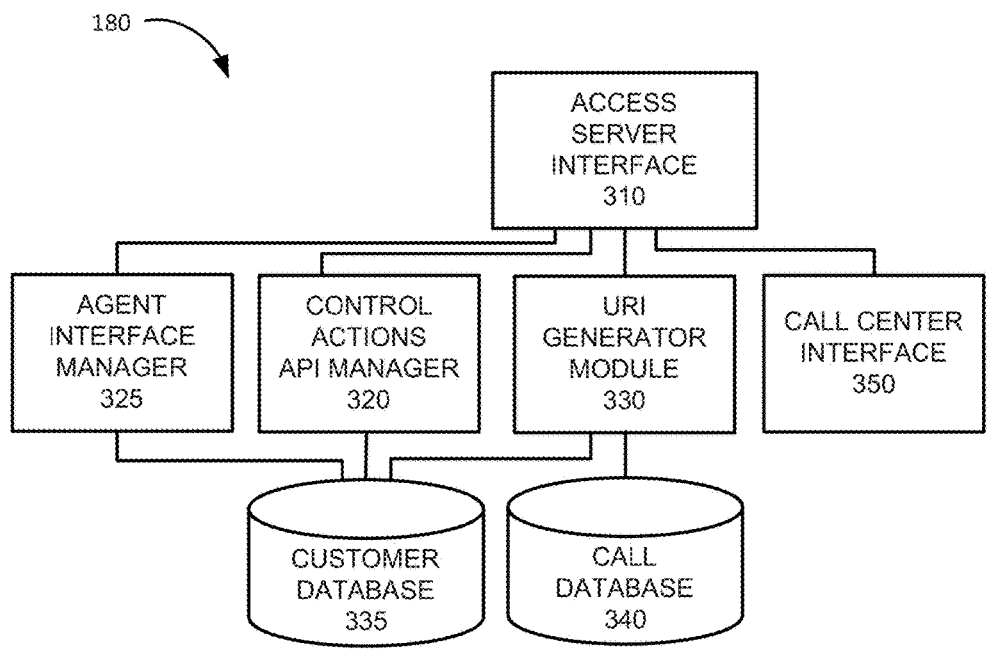
FIG. 3 is a diagram illustrating exemplary functional components of the backend system of FIG. 1.

FIG. 3 is a diagram of exemplary functional components of WebRTC backend system 180. The functional components of WebRTC backend system 180 may be implemented, for example, via processor 220 executing instructions from memory 230. Additionally or alternatively, some or all of the functional components of WebRTC backend system 180 may be hard-wired. As shown in FIG. 3, WebRTC backend system 180 may include an access server interface 310, a control actions API manager 320, an agent interface manager 325, a URI generation module 330, a customer database 335, a call database 340, and a call center interface 350.

Access server interface 310 may communicate with WebRTC access server 130 and may establish a secure communication channel with WebRTC access server 130. Control actions API manager 320 may manage a control action API that may be provided to customer web server 130. For example, control actions API manager 320 may keep track of what particular type and/or version of a control actions API a particular customer web server 130 has been provided with based on information stored in customer database 335. Control actions API manager 320 may update a particular control action API at a particular customer web server 130 at particular intervals. Furthermore, control actions API manager 320 may generate, update, and/or otherwise manage transfer scripts for a customer. A transfer script may define a sequence of control actions to be performed for a particular type of transfer.

Agent interface manager 325 may manage agent interfaces that may be provided to customer web server 130. For example, agent interface manager 325 may customize an agent interface based on options requested by customer web server 130 and may provide a customized agent interface to customer web server 130.

URI generator module 330 may generate a WebRTC URI for a WebRTC call requested by customer web server 130 based on information stored in customer database 335. Customer database 335 may store information associated with particular customers. For example customer database 335 may store information identifying a particular customer (e.g., a corporate identifier (ID), etc.); may store specifications for URI generation associated with the particular customer; may store information identifying a particular contact center services system 190, or an instance running on a particular contact center services system 190, which is associated with the particular customer; may store a particular control actions API, and/or control actions API version, which is associated with the particular customer; may store information relating to agent interfaces associated with the particular customer; and/or may store other types of information associated with the particular customer.

A WebRTC URI, generated by URI generation module 330, may direct WebRTC caller 110 to contact center services system 190. URI generator module 330 may generate a new call record in call database 340 and may store the generated URI in the new call record. Call database 340 may store information relating to particular WebRTC calls associated with particular customer web servers 130. For example, call database 340 may store a call ID that uniquely identifies a particular WebRTC call; a customer ID that associates a particular customer with the particular WebRTC call; call session data associated with the particular WebRTC call, such as information associated with the caller, a reason for the call, an indication that a particular action should be taken with respect to the caller, and/or other types of call session data; a URI generated for the call by URI generator 320; an indication as to whether the URI is still valid for the particular WebRTC call; and/or other types of information associated with the particular WebRTC call.

In some implementations, the WebRTC URI generated to a WebRTC call by URI generation module 320 of WebRTC backend system 180 may be used to associate control actions with a particular WebRTC call in contact center services system 190. In other implementations, contact center services system 190 may generate a URI for a WebRTC call, may provide the generated URI to customer web server 130, and may be used by customer web server 130 to associate control actions with the WebRTC call.

Call center interface 350 may communicate with contact center services system 190 by forwarding messages from customer web server 130 to contact center services system 190 and/or by forwarding messages from contact center services system 190 to customer web server 130.

Although FIG. 3 shows exemplary functional components of WebRTC backend system 180, in other implementations, WebRTC backend system 180 may include fewer functional components, different functional components, differently arranged functional components, or additional functional components than depicted in FIG. 3. Additionally or alternatively, one or more functional components of WebRTC backend system 180 may perform functions described as being performed by one or more other functional components of WebRTC backend system 180.

Figure 4:
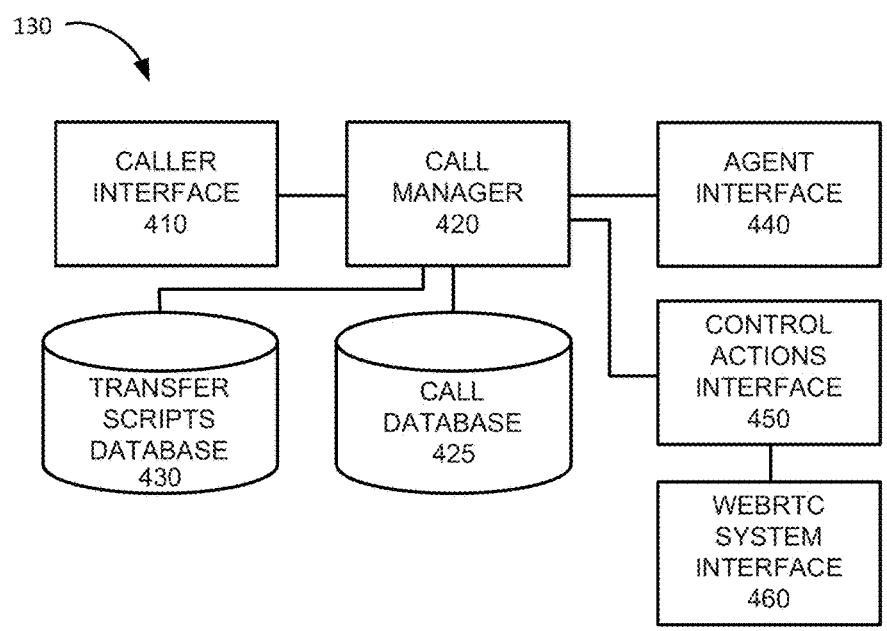
FIG. 4 is a diagram illustrating exemplary functional components of the customer web server of FIG. 1.

FIG. 4 is a diagram of exemplary functional components of customer web server 130. The functional components of customer web server 130 may be implemented, for example, via processor 220 executing instructions from memory 230. Additionally or alternatively, some or all of the functional components of customer web server 130 may be hard-wired. As shown in FIG. 4, customer web server 130 may include a caller interface 410, a call manager 420, a call database 425, a transfer scripts database 430, an agent interface 440, a control actions interface 450, and a WebRTC system interface 460.

Caller interface 410 may communicate with WebRTC caller 110 by, for example, providing a WebRTC validation URI to WebRTC caller 110 in response to WebRTC caller 110 initiating a WebRTC call. Call manager 420 may manage calls associated with customer web server 130. For example, call manager 420 may generate a control action, such as an instruction to play a particular message to a caller associated with a call; an instruction to park the call; an instruction to provide an estimated wait time to the caller; an instruction to obtain particular information from the caller; an instruction to initiate a callback; an instruction to send the call to a particular entry point in an IVR flow; an instruction to transfer the call to a selected contact center agent; and/or another type of control action. Call manager 420 may access call database 425 when generating a control action.

Call database 425 may store information associated with particular calls. For example, call database 425 may store a call URI associated with a call; call session data associated with the particular WebRTC call, such as information associated with the caller, a reason for the call, an indication that a particular action should be taken with respect to the caller, and/or other types of call session data; call transfer requests that have been generated and/or performed for the call; and/or other types of information associated with the particular call.

Furthermore, call manager 420 may access information stored in transfer scripts database 430 when processing call transfer. Transfer scripts database 430 may store transfer scripts associated with particular types of transfers. A transfer script may define a sequence of control actions that are to be performed for a particular type of transfer. For example, transfer scripts database 430 may define a first script for a blind transfer from a first WebRTC contact center agent to a second WebRTC contact center agent, an attended transfer from a WebRTC contact center agent to an IP contact center agent, etc.

Agent interface 440 may communicate with WebRTC contact center agent 192, may provide an agent interface to WebRTC contact center agent 192, and/or may receive a transfer request from WebRTC contact center agent 192. Control actions interface 450 may receive an instruction to perform a control action from call manager 420, such as an instruction to perform a call transfer, and may generate an instruction to perform a control action in a format compatible with a particular instance, associated with customer web server 1130, running on contact center services system 190. The instruction may be provided to WebRTC system interface 460. WebRTC system interface 460 may communicate with WebRTC access server 130 and may establish a secure communication channel with WebRTC access server 130.

Although FIG. 4 shows exemplary functional components of customer web server 130, in other implementations, customer web server 130 may include fewer functional components, different functional components, differently arranged functional components, or additional functional components than depicted in FIG. 4. Additionally or alternatively, one or more functional components of customer web server 130 may perform functions described as being performed by one or more other functional components of customer web server 130.

Figure 5:
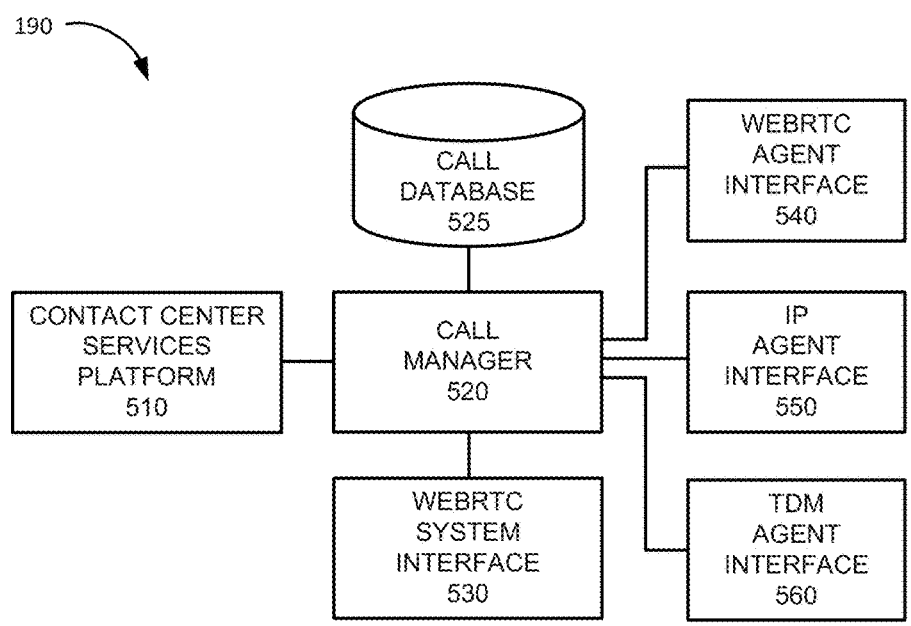
FIG. 5 is a diagram illustrating exemplary functional components of the contact center services system of FIG. 1.

FIG. 5 is a diagram of exemplary functional components of contact center services system 190. The functional components of contact center services system 190 may be implemented, for example, via processor 220 executing instructions from memory 230. Additionally or alternatively, some or all of the functional components of contact center services system 190 may be hard-wired. As shown in FIG. 5, contact center services system 190 may include a contact center services platform 510, a call manager 520, a call database 525, a WebRTC system interface 530, WebRTC agent interface 540, IP agent interface 550, and a TDM agent interface 560.

Contact center services platform 510 may include one or more instances of a contact center services platform associated with a particular customer. For example, contact center services platform 510 may include an Interactive Voice Response (IVR) platform, with or without Automatic Speech Recognition (ASR), which may request information from a caller and may direct the caller to a particular destination.

Call manager 520 may process control actions for a particular call. For example, control action manager 520 may use a URI to associate a particular control action with a particular WebRTC call being processed by contact center services system 190. For example, call manager 520 may execute a set of control actions for transferring a call from a first contact center agent to a second contact center agent. In some implementations, control action manager 520 may generate a URI for a particular WebRTC call and may provide the generated URI to customer web server 130 via WebRTC backend system 180. In other implementations, control action manager 520 may receive a validation URI for a WebRTC call, from WebRTC backend system 180, wherein the received validation URI has been generated by WebRTC backend system 180 in order to validate the WebRTC call via validation proxy 170.

Call manager 520 may generate a call record for a WebRTC call in response to a WebRTC call being answered by contact center services platform 510 and may store the generated call record in call database 525. Call database 525 may store call records relating to particular calls being processed, or calls that have been processed in the past, by contact center services platform 510. A call record may store a call URI identifying a particular call, a customer ID identifying a particular customer associated with the particular call, control actions that have been performed with respect to the particular call, pending control actions that are to be performed with respect to the particular call, report messages that have been sent for the particular call, pending report messages that are to be sent for the particular call, a particular point in an IVR call flow associated with the particular call, information associated with a caller associated with the particular call, information relating to transfers that have been performed for the particular call or that are to be performed for the particular call; and/or other types of information relating to the particular call.

Call manager 520 may receive an instruction to perform a control action from customer web server 130 via WebRTC backend system 180, may retrieve a URI from the instruction, may identify a WebRTC call associated with the retrieved URI instruction based on call records stored in call database 525, and may perform the control action with respect to the identified WebRTC call based on the received instruction. Furthermore, call manager 520 may send a response message to customer web server 130, via WebRTC backend system 180, in response to performing the control action. Moreover, call manager 520 may send a report message, relating to a particular WebRTC call, to customer web server 130 via WebRTC backend system 180, and may receive a response confirming that the report message has been received.

WebRTC system interface 530 may communicate with WebRTC backend system 180. For example, WebRTC system interface 530 may forward messages from contact center services system 190 to WebRTC backend system 180 and/or may receive messages from WebRTC backend system 180 and provide the received messages to contact center services system 190. WebRTC agent interface 540 may communicate with WebRTC contact center agent 192. IP agent interface 550 may communicate with IP contact center agent 194. TDM agent interface 560 may communicate with TDM contact center agent 198.

Although FIG. 5 shows exemplary functional components of contact center services system 190, in other implementations, contact center services system 190 may include fewer functional components, different functional components, differently arranged functional components, or additional functional components than depicted in FIG. 5. Additionally or alternatively, one or more functional components of contact center services system 190 may perform functions described as being performed by one or more other functional components of contact center services system 190.

Figure 6:
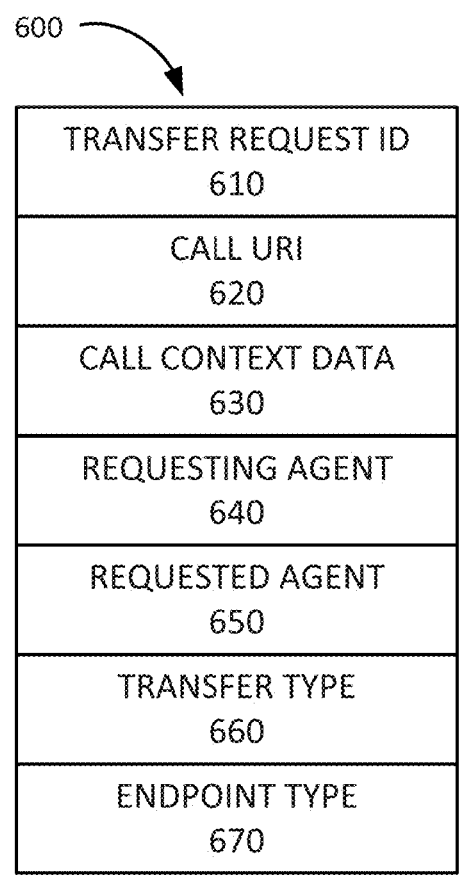
FIG. 6 is a diagram illustrating exemplary components of a transfer request according to an implementation described herein.

FIG. 6 is a diagram illustrating exemplary components of a transfer request 600 according to an implementation described herein. Transfer request 600 may be sent by WebRTC contact center agent 192 to customer web server 130 when WebRTC contact center agent 192 requests to transfer a call to another contact center agent. As shown in FIG. 6, transfer request 600 may include a transfer request identifier (ID) field 610, a call URI field 620, a call context data field 630, a requesting agent field 640, a requested agent field 650, a transfer type field 660, and an endpoint type field 670.

Transfer request ID field 610 may store an identifier, such as string of characters, associated with a particular transfer request. Call URI field 620 may store a URI identifying a particular call associated with the particular transfer request.

Call context data field 630 may include call context data associated with the particular call, such as information associated with a caller, such as the caller's name, address, phone number, geographic location, account number, purchase history, subscription details, and/or any other information associated with a caller; a reason associated with the particular call; an indication that the caller has been flagged for a particular action; and/or other types of call context data.

Requesting agent field 640 may include information identifying the particular contact center agent originating the transfer request. Requested agent field 650 may include information identifying a contact center agent to which the call is to be transferred, such as information identifying a particular contact center agent and/or information identifying a particular contact center agent type.

Transfer type field 660 may identify a requested transfer type, such a blind transfer, an attended transfer, a conference transfer, and/or another type of transfer. A blind transfer may correspond to a transfer from a first contact center agent to a second contact center agent, in which a connection is made to a second contact center agent and a connection to the first contact center agent is ended. An attended transfer may correspond to a transfer from a first contact center agent to a second contact center agent in which a connection is made to the second contact center agent, and in which the first contact center agent is connected to the second contact center agent while the caller is put on hold, enabling the first contact center agent to talk with the second contact center agent. A conference transfer may correspond to a transfer from a first contact center agent to a second contact center agent, in which a connection is made to a second contact center agent and the first contact center agent, the second contact center agent, and the caller are able to communicate.

Endpoint type field 670 may identify an endpoint type associated with the requested agent, such as whether the requested agent corresponds to WebRTC contact center agent 192, IP contact center agent 194, TDM contact center agent 198, and/or another type of contact center agent.

Although FIG. 6 shows exemplary components of transfer request 600, in other implementations, transfer request 600 may include fewer components, different components, differently arranged components, or additional components than depicted in FIG. 6.

Figure 7:
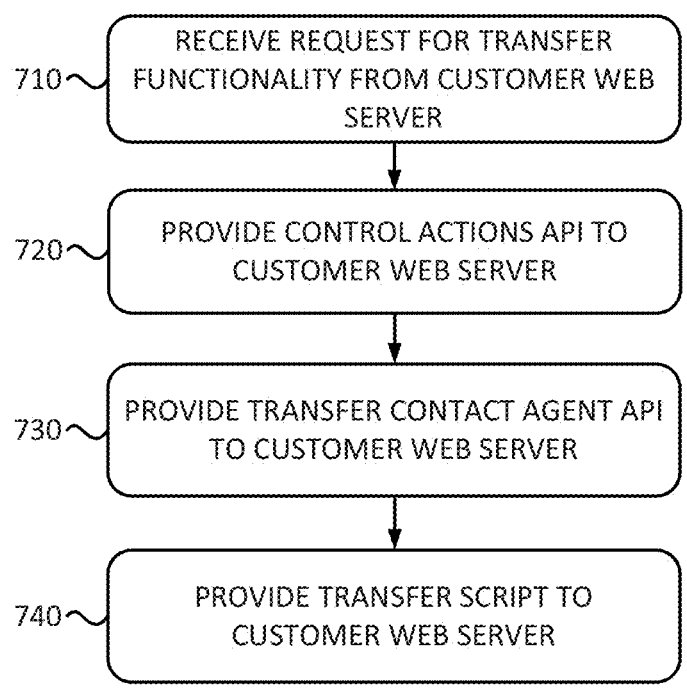
FIG. 7 is a flow chart of an exemplary process for providing web call processing interfaces to a customer server according to an implementation described herein.

FIG. 7 is a flow chart of an exemplary process for providing web call processing interfaces to a customer server according to an implementation described herein. In some implementations, the process of FIG. 7 may be performed by WebRTC backend system 180. In other implementations, some or all of the processes of FIG. 7 may be performed by another device or a group of devices separate from WebRTC backend system 180 and/or including WebRTC backend system 180.

The process of FIG. 7 may include receiving a request for transfer functionality from a customer web server (block 710). For example, customer web server 130 may request functionality to perform control actions, including call transfers, on calls handled by contact center services system 190 on behalf of customer web server 130. A control actions API may be provider to the customer web server (block 720). For example, control actions API manager 320 may provide a control actions API to customer web server. The control actions API may enable customer web server 130 to send control actions for calls to contact center services system 190.

A transfer contact agent API may be provided to the customer web server (block 730). For example, agent interface manager 325 may enable customer web server 130 to provide specifications for generating an agent interface, may generate a custom agent interface based on the specifications, and may provide the customer agent interface to customer web server 130. The customer agent interface may be provided by customer web server 130 to a contact center agent, associated with customer web server 130 and connected to contact center services system 190.

A transfer script may be provided to the customer web server (block 740). For example, control actions API manager 320 may generate one or more transfer scripts for particular transfer types. Each transfer script may include a sequence of one or more control actions to be generated and sent to contact center services system 190, using the control actions API, when the particular type of control transfer is to be performed.

Figure 8:
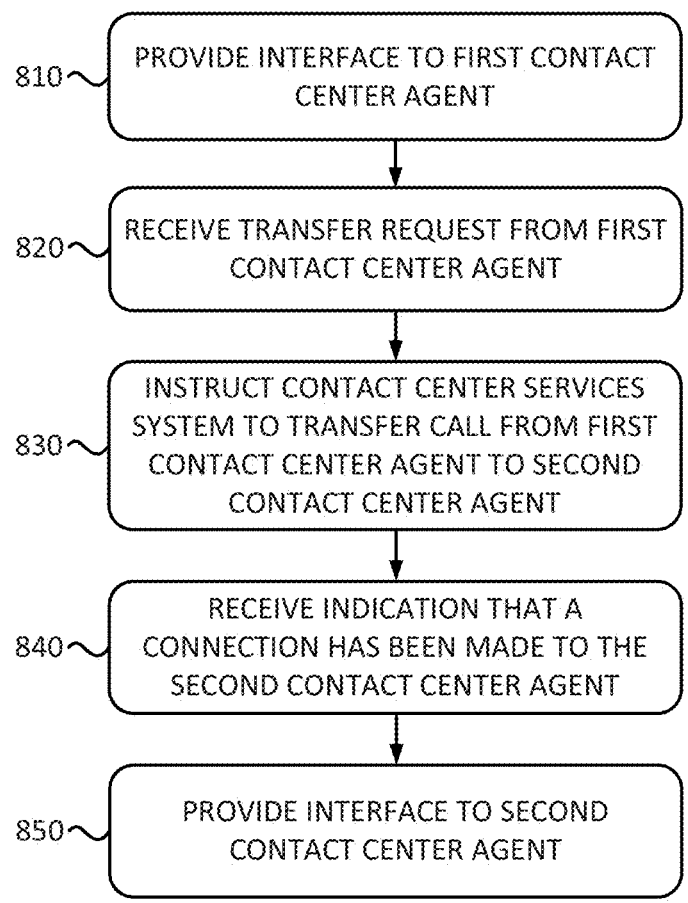
FIG. 8 is a flow chart of a first exemplary process for processing a transfer request according to an implementation described herein.

FIG. 8 is a flow chart of a first exemplary process for processing a transfer request according to an implementation described herein. In some implementations, the process of FIG. 8 may be performed by customer web server 130. In other implementations, some or all of the processes of FIG. 8 may be performed by another device or a group of devices separate from customer web server 130 and/or including customer web server 130.

The process of FIG. 8 may include providing an interface to a first contact center agent (block 810). For example, contact center services system 190 may connect a WebRTC call from WebRTC caller 110 to WebRTC contact center agent 192. In some implementations, customer web server 130 may receive an indication, via WebRTC backend system 180 and WebRTC access server 140, from contact center services system 190 that the WebRTC call was connected to WebRTC contact center agent 192. In other implementations, customer web server 130 may receive the indication, that the WebRTC call was connected to WebRTC contact center agent 192, from WebRTC contact center agent 192 rather than from contact center services system 190.

In response to receiving the indication, customer web server 130 may provide an agent interface to the contact center agent. As an example, customer web server 130 may provide a web page to WebRTC contact center agent 192.

The web page may include information relating to the call, such as a reason for the call; an indication flagging the call for a particular action (e.g., a promotion, a survey, etc.); statistics associated with the call, such as a total time for the call, a total hold time for the call, and/or a number of transfers for the call; and/or other information relating to the call. Furthermore, the web page may include information relating to the caller, such as the caller's name, address, contact information, account information, and/or other information relating to the caller. Moreover, the web page may include transfer options, such as an option to select a transfer type (e.g., blind transfer, attended transfer, conference transfer, etc.), available contact center agent types, available particular contact center agents and estimated wait times for each available agent, an/or any other transfer related information.

In other implementations, the interface may be provided in a format associated with a contact center agent application that is managed by customer web server 130 and installed on the contact center agent device. In some implementations, an interface may be also provided by customer web server 130 to other types of contact center agents, such as IP contact center agent 194 and/or TDM contact center agent 198. As an example, customer web server 130 may establish a secure IP connection to private provider network 160 via an IP gateway 165 and may send the agent interface (e.g., a web page) to the IP address associated with IP contact center agent 194. As another example, TDM contact center agent 198 may be configured for IP connectivity and may have an IP address which may be included in a routing table of a first IP gateway 165. Customer web server 130 may establish a secure IP connection to private provider network 160 via a second IP gateway 165 and may send the agent interface (e.g., a web page) to the IP address associated with TDM contact center agent 198. The agent interface may be routed through private provider network 160 to the first IP gateway 165 and from the first IP gateway 165 to TDM contact center agent 198 via TDM network 196.

A transfer request may be received from the first contact center agent (block 820). For example, the contact center agent may click on a selection object on the agent interface, requesting a particular type of transfer to a particular contact center agent or to a particular contact center agent type. The request may be received by customer web server 130. A contact center services system may be instructed to transfer a call to a second contact center agent (block 830). For example, call manager 420 of customer web server 130 may access transfer scripts database 430 to retrieve a transfer script associated with the requested transfer type and may generate instructions for performing one or more control actions, which may be sent to WebRTC access server 140 via control actions interface 450 an WebRTC system interface 460. WebRTC access server 140 may forward the instructions to WebRTC backend system 180 and WebRTC backend system 180 may forward the instructions to contact center services system 190.

An indication may be received that a connection has been made to the second contact center agent (block 840). As an example, contact center services system 190 may send an indication back to customer web server 130, via WebRTC backend system 180 and WebRTC access server 140, that a connection has been made to the second contact center agent associated with the received transfer request. As another example, the indication may be received by customer web server 130 from the second contact center agent.

An interface may be provided to the second contact center agent (block 850). For example, in response to receiving the indication that a connection has been made to the second contact center agent, customer web server 130 may provide an agent interface to the second contact center agent. The second contact center agent may now be able to access information relating to the call using the agent interface and/or may be able to a call transfer to another contact center agent if necessary.

Figure 9:
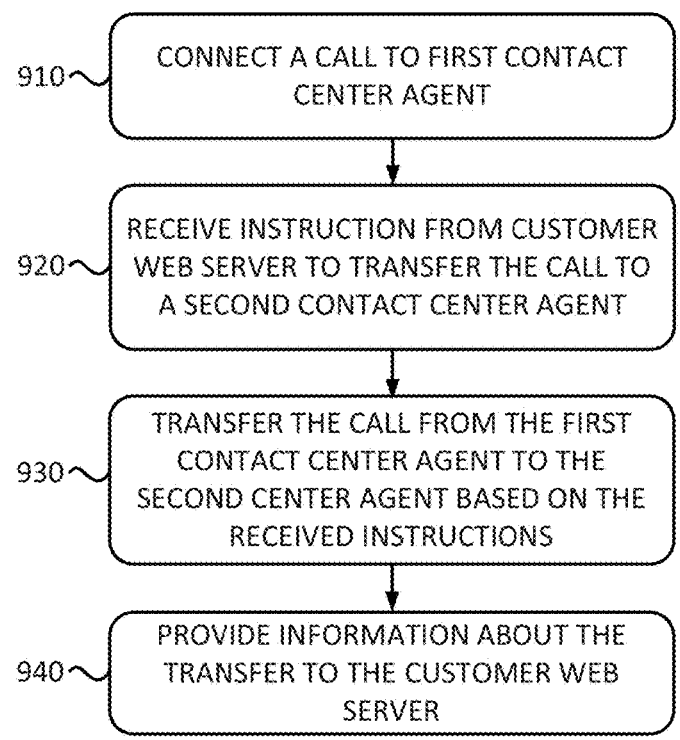
FIG. 9 is a flow chart of a second exemplary process for processing a transfer request according to an implementation described herein.

FIG. 9 is a flow chart of a second exemplary process for processing a transfer request according to an implementation described herein. In some implementations, the process of FIG. 9 may be performed by contact center services system 190. In other implementations, some or all of the processes of FIG. 9 may be performed by another device or a group of devices separate from contact center services system 190 and/or including contact center services system 190.

The process of FIG. 9 may include a connecting a call to a first contact center agent (block 910). For example, contact center services system 190 may select a first contact center agent and may connect a caller (e.g., WebRTC caller 110) to the selected first contact center agent. The first contact center agent may be selected based on the caller's interaction with an IVR flow, based on an instruction received from customer web server 130, based on information obtained from customer web server 130, and/or using another technique. The caller may include WebRTC caller 110, IP caller 112, TDM caller 114, or another type of caller. The first contact center agent may include WebRTC contact center agent 192, IP contact center agent 194, TDM contact center agent 198, or another type of contact center agent.

An instruction may be received from a customer web server to transfer the call to a second contact center agent (block 920). For example, contact center agent system 190 may receive one or more instructions to perform one or more control actions from customer web server 130, via WebRTC access server 140 and WebRTC backend system 180. The call may be transferred from the first contact center agent to a second contact center agent based on the received instruction (block 930). In response to receiving the one or more instructions, contact center services system 190 may connect the call to the second contact center agent. The second contact center agent may include WebRTC contact center agent 192, IP contact center agent 194, TDM contact center agent 198, or another type of contact center agent. Based on the received one or more instructions, contact center services system 190 may perform other actions associated with the transfer, such as putting the caller on hold while the first contact center agent and the second contact center agent talk, disconnecting the first contact center agent, etc.

Information about the transfer may be provided to the customer web server (block 940). For example, contact center services system 190 may send a report message to customer web server 130, via WebRTC backend system 180 and WebRTC access server 130, indicating that the one or more instructions, to perform the one or more control actions relating to the call transfer, have been successfully carried out.

Figure 10:
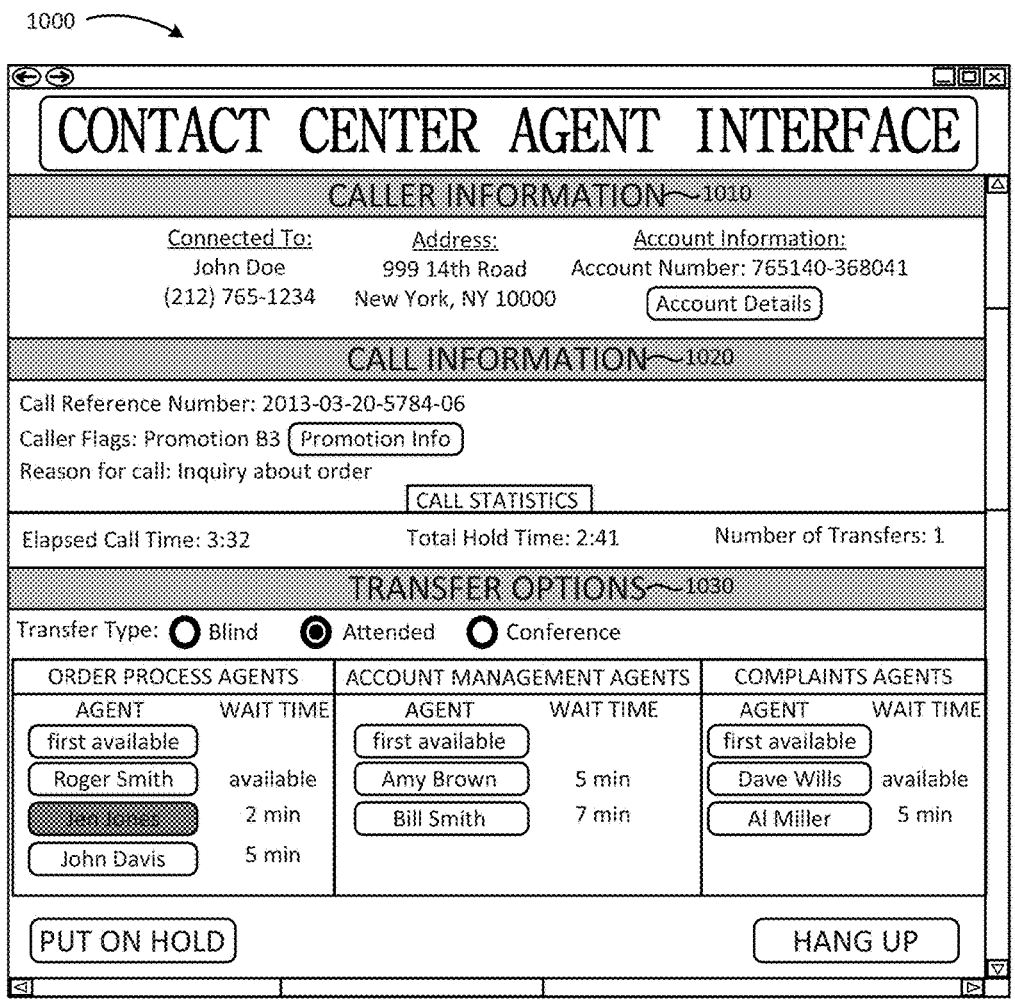
FIG. 10 is a diagram of an exemplary interface that may be presented to a contact center agent according to an implementation described herein.

FIG. 10 is a diagram of an exemplary interface 1000 that may be presented to a contact center agent according to an implementation described herein. Interface 1000 may be provided to a contact center agent by customer web server 130 in response to receiving an indication from contact center services system 190, via WebRTC backend system 180 and WebRTC access server 140, that a call has been connected to the contact center agent. For example, interface 1000 may be included in a web page that is provided to the contact center agent when the contact center agent answers a call from contact center services system 190.

As shown in FIG. 10, interface 1000 may include a caller information area 1010, a call information area 1030, and a transfer options area 1030. Caller information area 1010 may include information about the caller, such as the caller's name, the caller's address, the caller's contact information, and/or information about an account associated with the caller. The caller information may be obtained by customer web server 130 based on the device the caller is using to place the call (e.g., a cookie placed on the device, an IP address associated with the device, etc.), based on the caller logging into customer web server 130, based on information provided to customer web server 130 by the caller, and/or using another technique.

Call information area 1020 may include information about the call, such an ID assigned to the call by customer web server 130, a flag assigned to the call the prompt a contact center agent to perform a particular action, a reason for the call provided by the caller, and/or call statistics, such a total elapsed time for the call, a total hold time for the call, and/or a number of transfers that have been made during the call. The call statistics may be used by a contact center agent to enforce particular customer service standards.

Transfer options area 1030 may include transfer options available to the contact center agent. For example, transfer options area 1030 may include a transfer type selection area to enable the user to select a type of transfer, such as a blind transfer, an attended transfer, or a conference call transfer. Furthermore, transfer options area 1030 may include available contact center agents, organized based on a type of contact center agent (e.g., order process agents, account management agents, complaints agents, etc.). The contact center agent may be able to select a particular contact center agent for the call transfer based on name or another type of identifier. In some implementations, an estimated wait time may be available for particular contact center agents based on information maintained by customer web server 130. Furthermore, each available contact center agent may be identified as being of a particular endpoint type (e.g., WebRTC contact center agent 192, IP contact center agent 194, TDM contact center agent 198, etc.). While not shown in FIG. 10, in some implementations, the endpoint type information, associated with particular available contact center agents, may be displayed in interface 1000. When the contact center agent select a particular available contact center agent for the call transfer, transfer request 600 may be generated and sent to customer web server 130.

Figure 11:
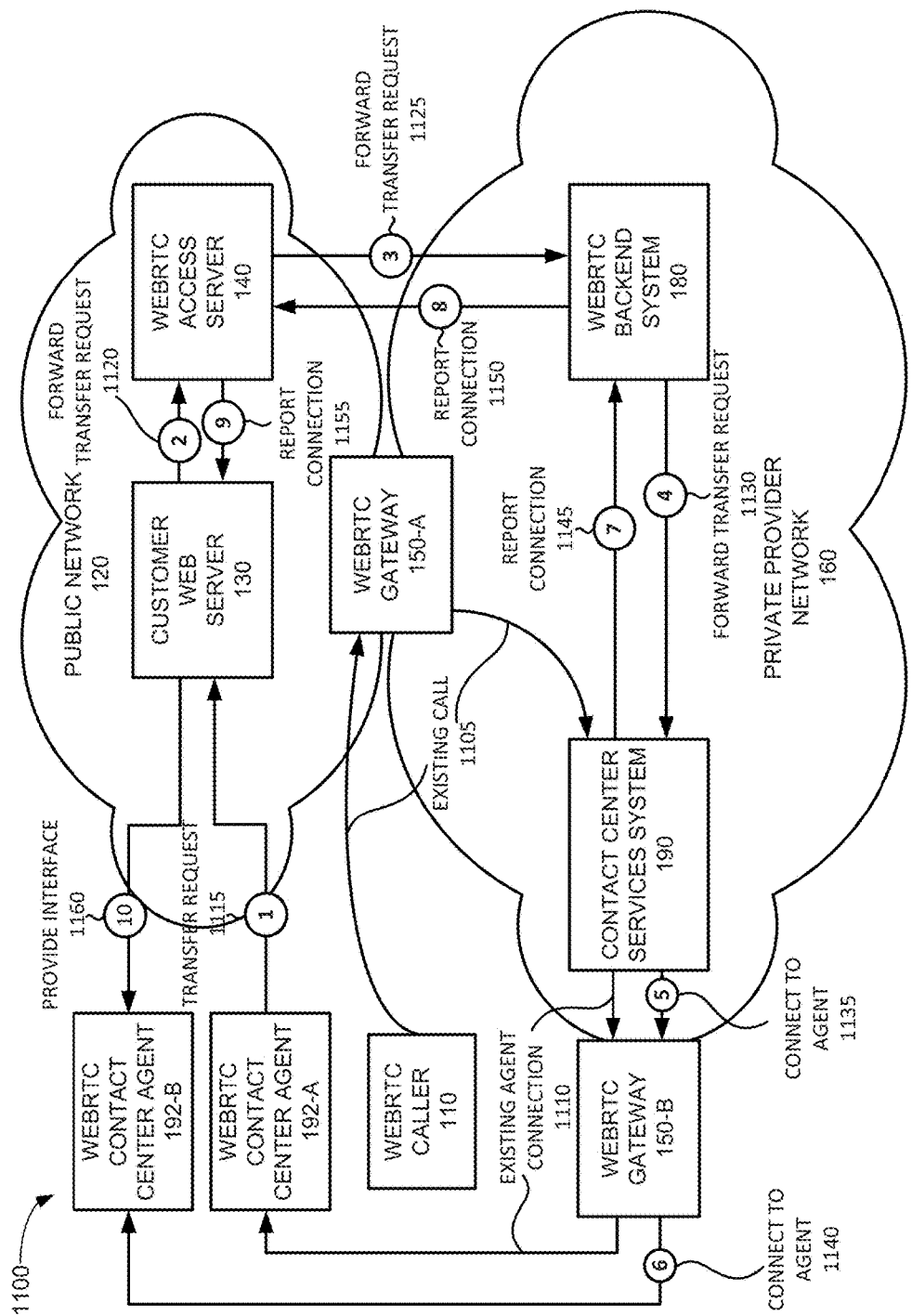
FIG. 11 is a diagram of a first signal flow for processing a call transfer according to an implementation described herein.

FIG. 11 is a diagram of a first signal flow 1100 for processing a call transfer according to an implementation described herein. Signal flow 1100 may be performed for a transfer from a first WebRTC contact center agent 192-A to a second WebRTC contact center agent 192-B. Signal flow 1100 may begin with an existing call connection from WebRTC caller 110 to contact center services system 190 via WebRTC gateway 150-A (signal 1105) and an existing connection from contact center services system 190 to first WebRTC contact center agent 192-A (signal 1110). Part of the establishing of the connection to first WebRTC contact center agent 192-A, which is not shown in FIG. 11, may include contact center services system 190 reporting the connection to customer web server 130 and customer web server 130 may provide an agent interface to first WebRTC contact center agent 192-A.

First WebRTC contact center agent 192-A may send transfer request 600 to customer web server 130 using an agent interface (signal 1115). Transfer request 600 may include information identifying second WebRTC contact center agent 192-B. Upon receiving the transfer request, customer web server 130 may forward a transfer request to WebRTC access server 140 (signal 1120), WebRTC access server 140 may forward the transfer request to WebRTC backend system 180 (signal 1125), and WebRTC backend system 180 may forward the transfer request to contact center services system 190 (signal 1130).

Upon receiving the transfer request, contact center services system 190 may connect to second WebRTC contact center agent 192-B via WebRTC gateway 150-B (signals 1135 and 1140). Contact center services system 190 may also close the existing connection to first WebRTC contact center agent 192-A. After the connection is made, contact center services system 190 may send a message, reporting the connection, to WebRTC backend system 180 (signal 1145). WebRTC backend system 180 may forward the report of the connection to WebRTC access server 140 (signal 1150) and WebRTC access server 140 may forward the report of the connection to customer web server 130 (signal 1155). In response to receiving the report of the connection to second WebRTC contact center agent 130, customer web server 130 may provide agent interface to second WebRTC contact center agent 130 (signal 1160), thereby completing the call transfer.

Figure 12A:
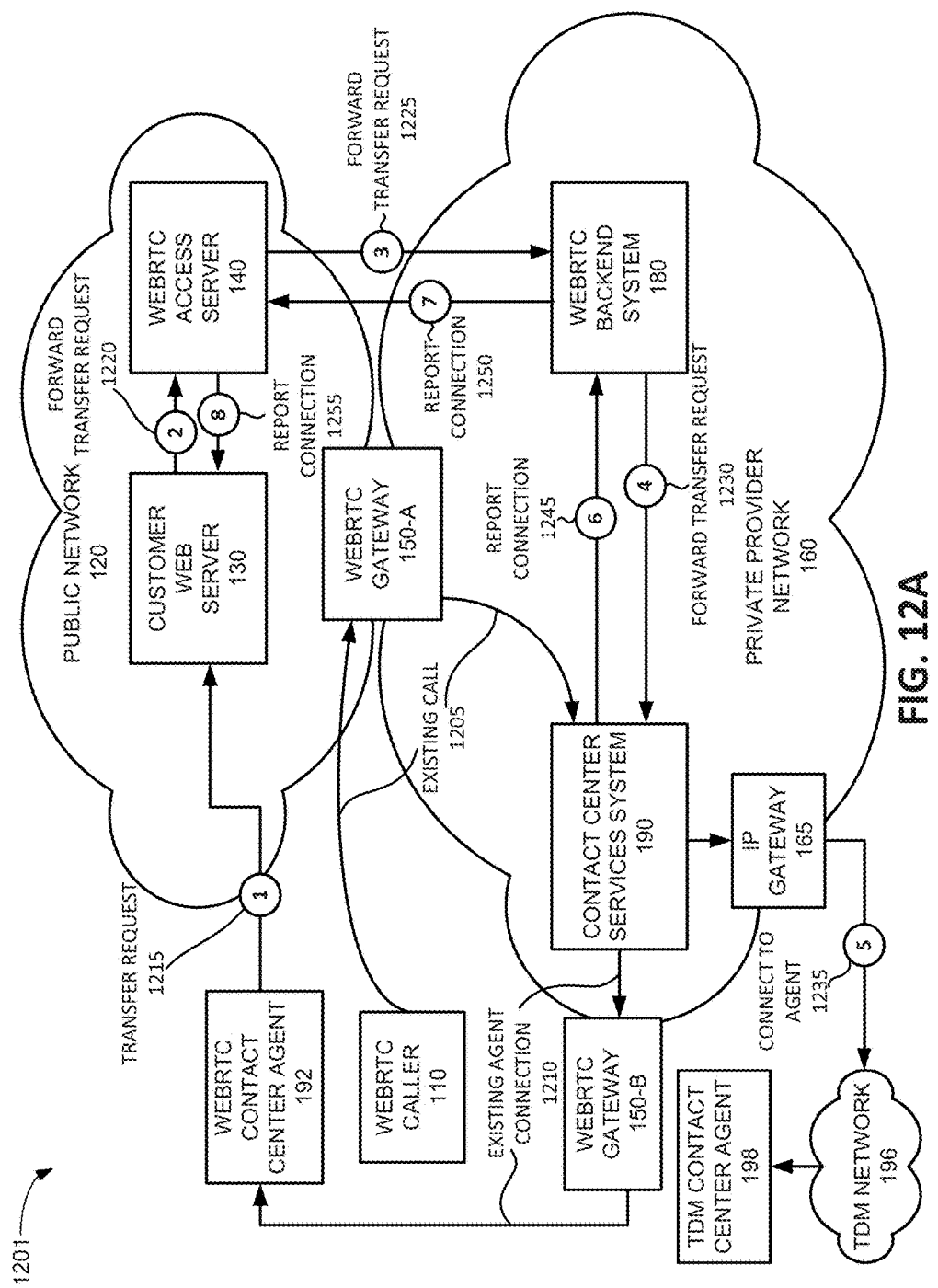
FIG. 12A is a diagram of a second signal flow for processing a call transfer according to an implementation described herein.

FIG. 12A is a diagram of a second signal flow 1201 for processing a call transfer according to an implementation described herein. Signal flow 1201 illustrates the transfer of a call from WebRTC contact center agent 192 to TDM contact center agent 198. Signal flow 1201 may begin with an existing call connection from WebRTC caller 110 to contact center services system 190 via WebRTC gateway 150-A (signal 1205) and an existing connection from contact center services system 190 to WebRTC contact center agent 192 (signal 1210). Part of the establishing of the connection to WebRTC contact center agent 192, which is not shown in FIG. 12A, may include contact center services system 190 reporting the connection to customer web server 130 and customer web server 130 may provide an agent interface to WebRTC contact center agent 192.

WebRTC contact center agent 192 may send transfer request 600 to customer web server 130 using an agent interface (signal 1215). Transfer request 600 may include information identifying another contact center agent to which the call should be transferred. In this instance, the other contact center agent may correspond to TDM contact center agent 198. Upon receiving the transfer request, customer web server 130 may forward a transfer request to WebRTC access server 140 (signal 1220), WebRTC access server 140 may forward the transfer request to WebRTC backend system 180 (signal 1225), and WebRTC backend system 180 may forward the transfer request to contact center services system 190 (signal 1230).

Upon receiving the transfer request, contact center services system 190 may connect to TDM contact center agent 198 via IP gateway 165 and TDM network 196 (signal 1235). Contact center services system 190 may also close the existing connection to WebRTC contact center agent 192. After the connection is made, contact center services system 190 may send a message, reporting the connection, to WebRTC backend system 180 (signal 1245). WebRTC backend system 180 may forward the report of the connection to WebRTC access server 140 (signal 1250) and WebRTC access server 140 may forward the report of the connection to customer web server 130 (signal 1255).

In some implementations, customer web server 130 may not be able to provide an agent interface to TDM contact center agent 198. However, in other implementations, customer web server 130 may be configured to provide an agent interface to TDM contact center agents 198. For example, TDM contact center agent 198 may be configured for IP connectivity and may have an IP address which may be included in a routing table of a first IP gateway 165. Customer web server 130 may establish a secure IP connection to private provider network 160 via a second IP gateway 165 and may send the agent interface to the IP address associated with TDM contact center agent 198. The agent interface may be routed through private provider network 160 to the first IP gateway 165 and from the first IP gateway 165 to TDM contact center agent 198 via TDM network 196.

Figure 12B:
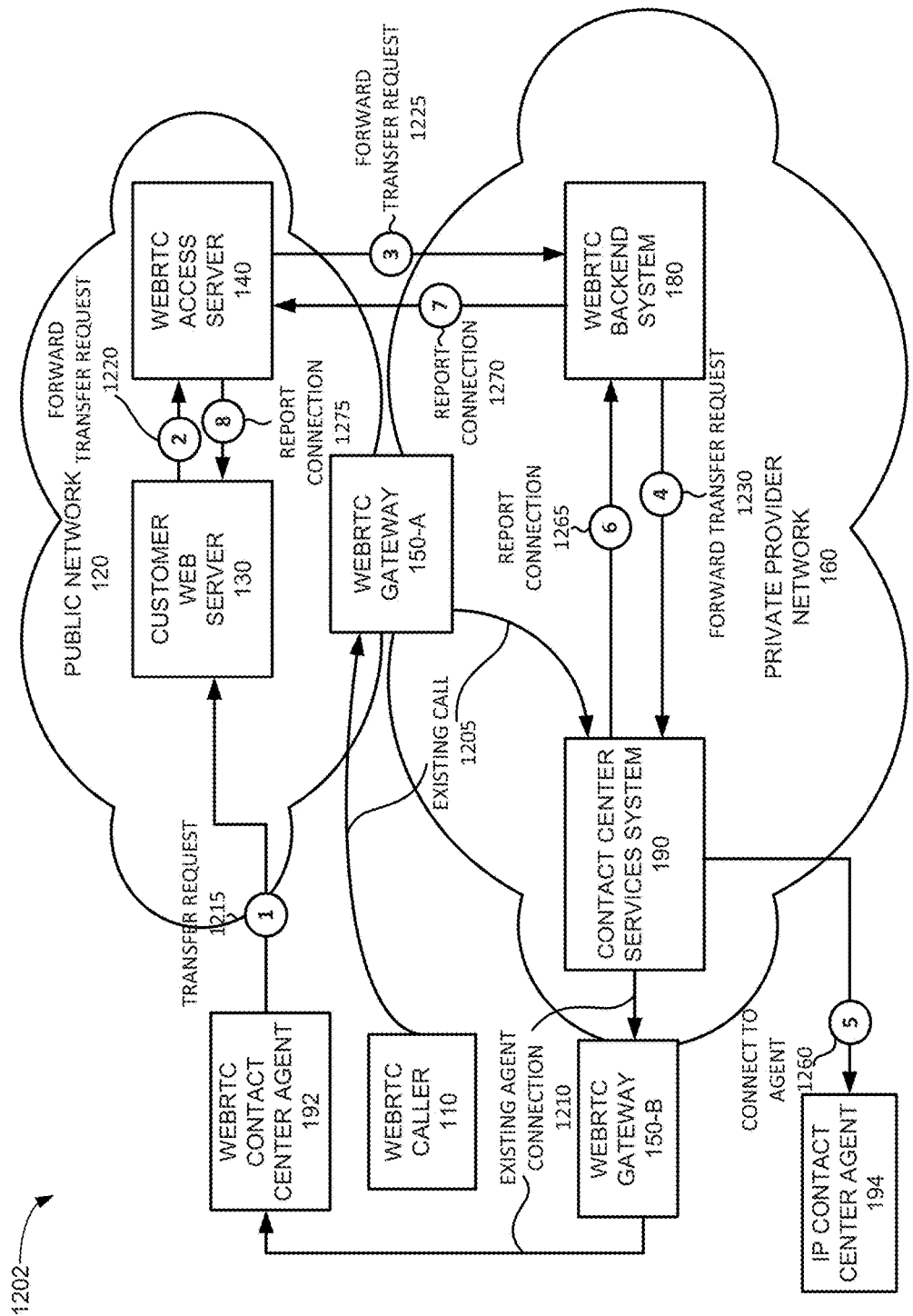
FIG. 12B is a diagram of a third signal flow for processing a call transfer according to an implementation described herein.

FIG. 12B is a diagram of a third signal flow 1202 for processing a call transfer according to an implementation described herein. Signal flow 1202 illustrates the transfer of a call from WebRTC contact center agent 192 to IP contact center agent 194. Signal flow 1202 may include signals 1205, 1210, 1215, 1220, 1225, 1230, as explained above with reference to FIG. 12A. However, in this instance, the transfer request may include a request to transfer the call from WebRTC contact center agent 192 to IP contact center agent 194.

Upon receiving the transfer request, contact center services system 190 may connect to IP contact center agent 194 (signal 1260). IP contact center agent 196 may be part of private provider network 160 and thus the connection may not need to go through IP gateway 165. Contact center services system 190 may also close the existing connection to WebRTC contact center agent 192. After the connection is made, contact center services system 190 may send a message, reporting the connection, to WebRTC backend system 180 (signal 1265). WebRTC backend system 180 may forward the report of the connection to WebRTC access server 140 (signal 1270) and WebRTC access server 140 may forward the report of the connection to customer web server 130 (signal 1275).

In some implementations, customer web server 130 may not be able to provide an agent interface to IP contact center agent 194. However, in other implementations, customer web server 130 may be configured to provide an agent interface to IP contact center agents 194. For example, customer web server 130 may establish a secure IP connection to private provider network 160 via an IP gateway 165 and may send the agent interface to the IP address associated with IP contact center agent 194.

Figure 13A:
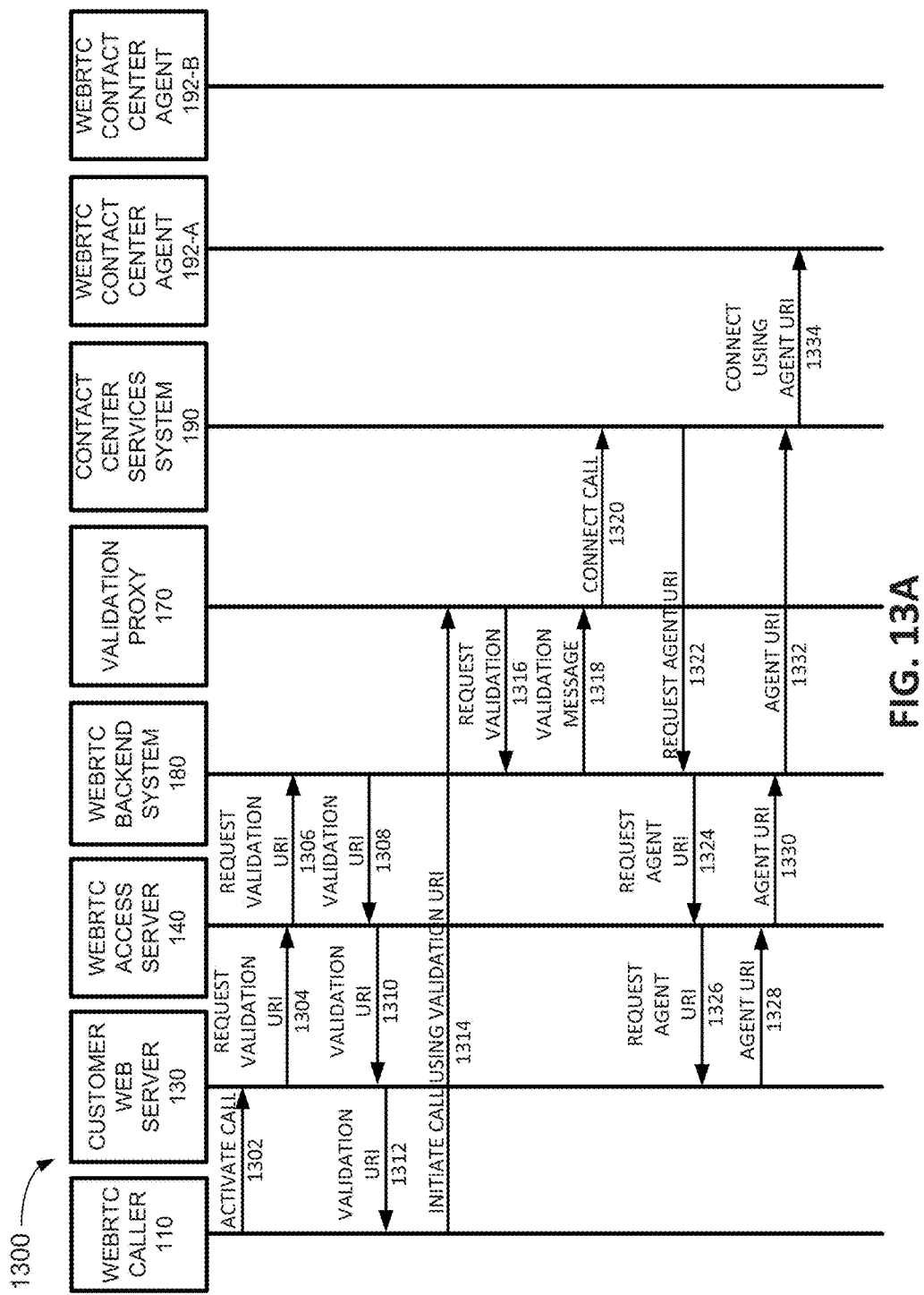
FIGS. 13A and 13B are diagrams of a first example illustrating a sequence of signals for transferring a call according to an implementation described herein.
Figure 13B:
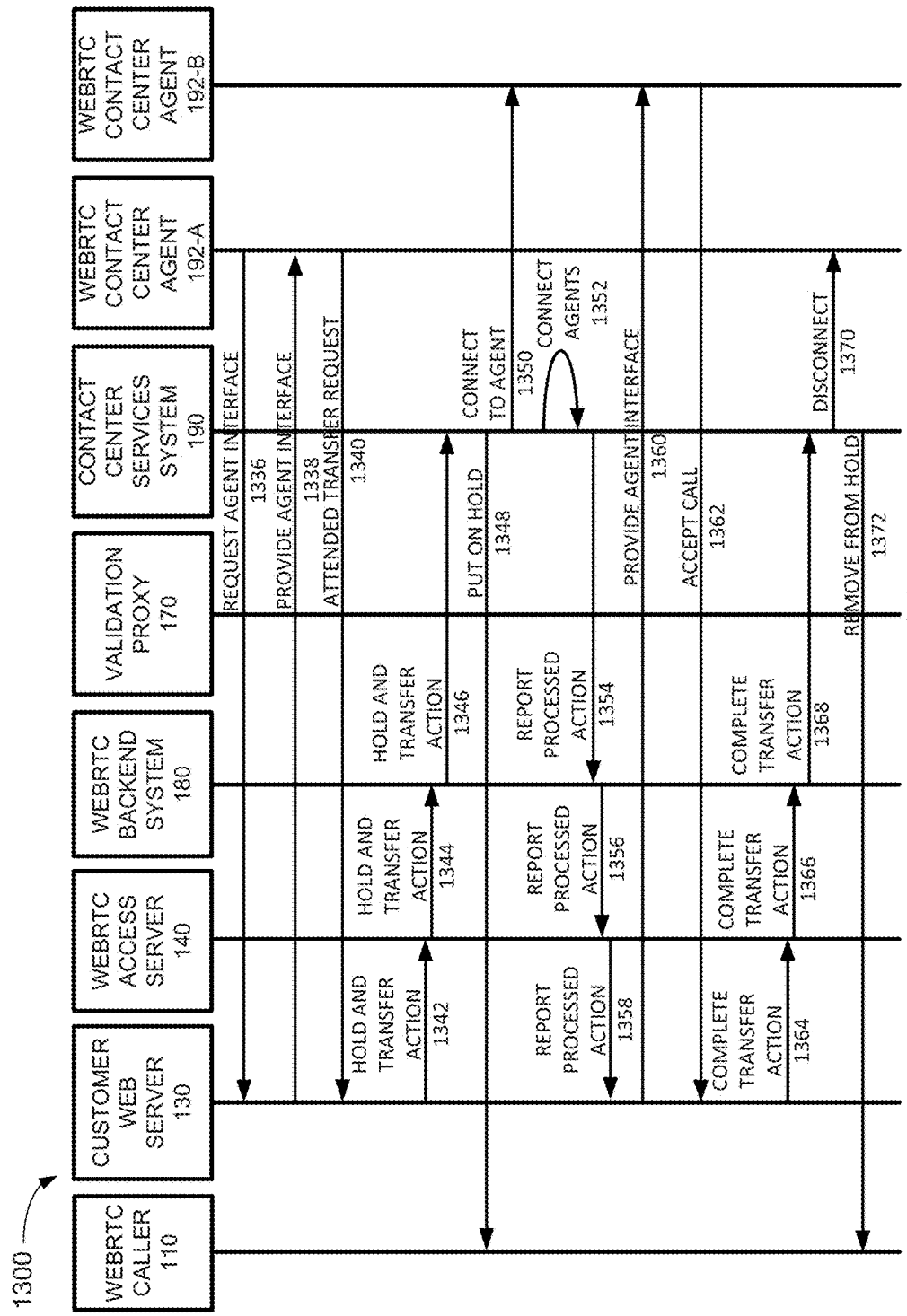

FIGS. 13A and 13B are diagrams of a first example illustrating a sequence 1300 of signals for transferring a call according to an implementation described herein. Sequence 1300 illustrates the access flow for establishing an incoming call from WebRTC caller 110 to contact center services system 190, establishing an egress connection from contact center services system 190 to a first WebRTC contact center agent 192-A, and performing an attended transfer from first WebRTC contact center agent 192-A to a second WebRTC contact center agent 192-B.

Sequence 1300 may begin with a user of a browser application running on WebRTC caller 110 activating a WebRTC call by clicking on a call selection object on a web page hosted by customer web server 130 (signal 1302). In response, customer web server 130 may request a validation URI for the requested WebRTC call from WebRTC backend system 180 via WebRTC access server 140 (signals 1304 and 1306). WebRTC backend system 180 may generate the validation URI and provide the validation URI to customer web server 130 via WebRTC access server 140 (signals 1308 and 1310). Customer web server 130 may provide the validation URI to WebRTC caller 110 (signal 1312) and WebRTC caller 110 may initiate the WebRTC call using the received validation URI by sending a request to validation proxy 170 (signal 1314) via WebRTC gateway 150 (not shown in FIG. 13). Validation proxy 170 may send a validation request to WebRTC backend system 180, using the validation URI (signal 1316) and WebRTC backend system 180 may respond by validating the WebRTC call (signal 1318). Once validation proxy 170 receives the validation message from WebRTC backend system 180, validation proxy may connect the call to contact center services system 190 by, for example, sending a SIP INVITE message to contact center services system 190 (signal 1320). A WebRTC call connection may now be established between WebRTC caller 110 and contact center services system 190.

Contact center services system 190 may guide the caller through an IVR script that may result in contact center services system 190 selecting a particular type of contact center agent (e.g., an order inquiry agent). Contact center services system 190 may request a contact center agent URI from customer web server 130 via WebRTC backend system 180 and WebRTC access server 140 (signals 1322, 1324, and 136). Furthermore, contact center services system 190 may generate a call URI that may be used to identify the call. The call URI may be provided to customer web server 130 in the first communication, relating to the call, from contact center services system 190 to customer web server 130. In this instance, the first communication may be the request for the contact center agent URI. The call URI may be used to associate control actions, generated by customer web server 130, with the call.

Customer web server 130 may select a first WebRTC contact center agent 192-A and may provide the URI, associated with the selected first WebRTC contact center agent 192-A, to contact center services system 190 via WebRTC access server 140 and WebRTC backend system 180 (signals 1328, 1330, and 1332). Contact center services system 190 may use the received contact center agent URI to establish a WebRTC call connection to WebRTC contact center agent 192-A (signal 1334). A WebRTC call connection may now be established between contact center services system 190 and first WebRTC contact center agent 192-A.

Continuing with sequence 1301 in FIG. 13B, when first WebRTC contact center agent 192-A answers the WebRTC call from contact center services system 190, first WebRTC contact center agent 192-A may request an agent interface from customer web server 130 (signal 1336) and customer web server 130 may provide the agent interface to first WebRTC contact center agent 192-A (signal 1338). For example, first WebRTC contact center agent 192-A may include a script that requests the agent interface from customer web server 130 when a WebRTC call is answered. In other implementations, contact center services system 190 may report the WebRTC call connection to first WebRTC contact center agent 192-A to customer web server 130, and customer web server 130 may provide the agent interface to first WebRTC contact center agent 192-A in response to receiving the report of the WebRTC call connection from contact center services system 190.

First WebRTC contact center agent 192-A may use the agent interface to request to transfer the WebRTC call to a second WebRTC contact center agent 192-B (signal 1340). In this instance, first WebRTC contact center agent 192-A may request an attended transfer that includes opening a connection to second WebRTC contact center agent 192-B without disconnecting first WebRTC contact center agent 192-A, so that the two agents can talk before the call is released to second WebRTC contact center agent 192-B.

In response to receiving the transfer request, customer web server 130 may generate an instruction to perform a control action to contact center services system 190 via WebRTC access server 140 and WebRTC backend system (signals 1342, 1344, and 1346). The instruction may include an instruction to put the caller on hold while a connection is made to second WebRTC contact center agent 192-B and may include a URI for second WebRTC contact center agent 192-B. In response to receiving the instruction, contact center services system 190 may place WebRTC caller 110 on hold, which may include a message played to WebRTC caller 110 (signal 1348). Furthermore, contact center services system 190 may use the URI included in the instruction to establish a WebRTC call connection with second WebRTC contact center agent 192-B (signal 1350) and may connect first WebRTC contact center agent 192-A with second WebRTC contact center agent 192-B (signal 1352).

After connecting to second WebRTC contact center agent 192-B, contact center services system 190 may report the connection to customer web server 130 via WebRTC backend system 180 and WebRTC access server 140 (signals 1354, 1356, and 1358). In response to receiving the message reporting the connection to second WebRTC contact center agent 192-B, customer web server 130 may provide an agent interface to second WebRTC contact center agent 192-B (signal 1360). Second the user of WebRTC contact center agent 192-B may use the received agent interface to accept the call, after talking with the user of first WebRTC contact center agent 192-A (signal 1362).

In response to receiving the message from second WebRTC contact center agent 192-B to accept the call, customer web server 130 may send another instruction to perform a control action to contact center services system 190, Via WebRTC access server 140 and WebRTC backend system 180, instructing contact center services system 190 to disconnect the call from first WebRTC contact center agent 192-A and to take WebRTC caller 110 off hold (signals 1364, 1366, and 1368). In response to receiving the instruction, contact center services system 190 may disconnect from first WebRTC contact center agent 192-A (signal 1370) and may remove WebRTC caller 110 from being on hold (signal 1372).

Figure 14:
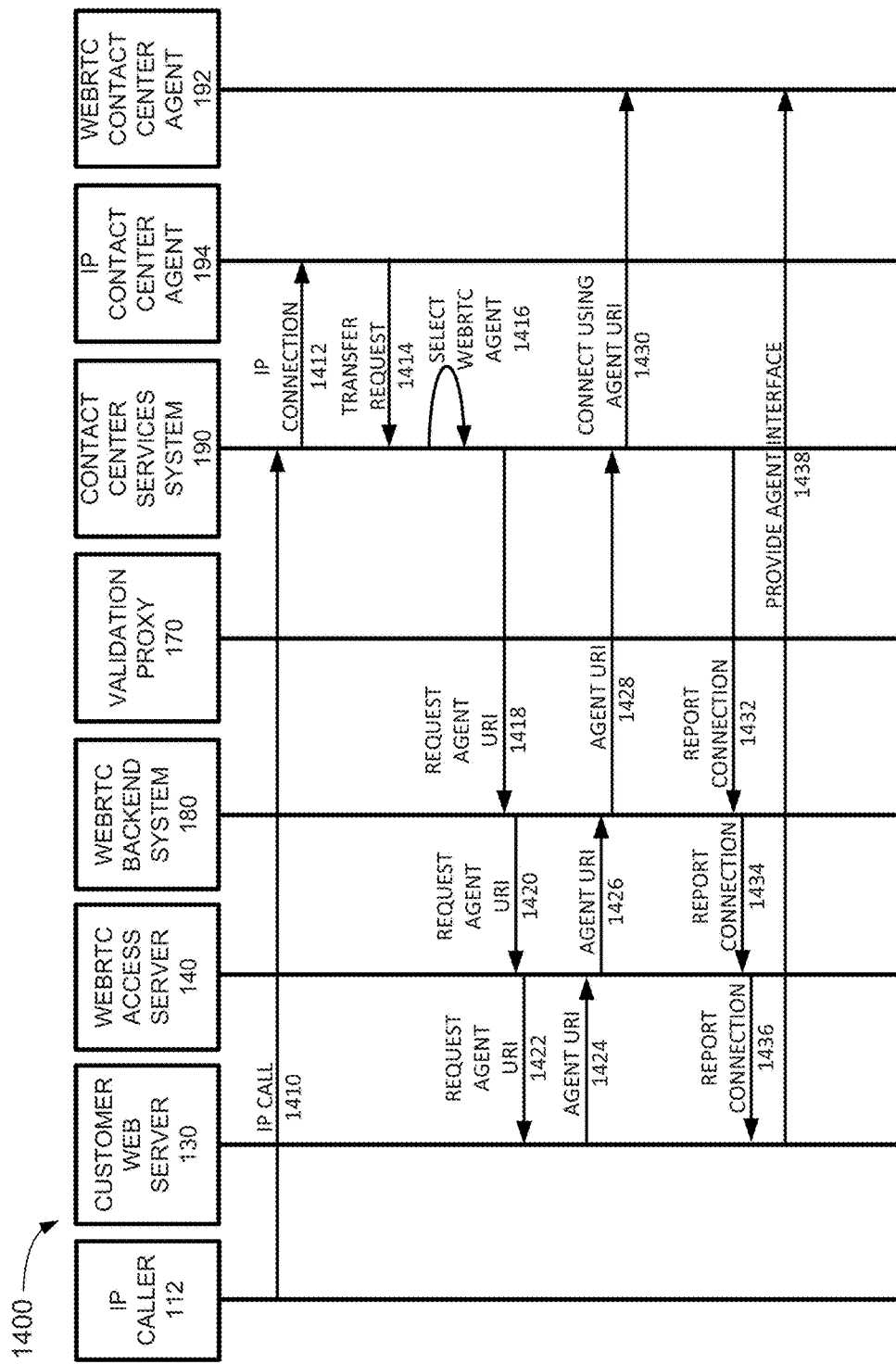
FIG. 14 is a diagram of a second example illustrating a sequence of signals for transferring a call according to an implementation described herein.

FIG. 14 is a diagram of a second example illustrating a sequence 1400 of signals for transferring a call according to an implementation described herein.

Sequence 1400 illustrates the access flow for establishing a call from IP caller 112 to IP contact center agent 194 and then transferring the call to WebRTC contact center agent 192. Sequence 1400 may begin with IP caller 112 initiating a VoIP call to contact center services system 190 (signal 1410). For example, the user of IP caller 112 may use a VoIP application running on IP caller 112 to dial a telephone number associated with customer web server 130 and an IP Multi-media Subsystem (IMS) in private provider network 160 (not shown in FIG. 14) may use the dialed telephone number to establish a SIP connection to contact center services system 190.

Contact center services system 190 may guide the caller through an IVR script that may result in contact center services system 190 selecting a particular type of contact center agent (e.g., an order inquiry agent). Contact center services system 190 may determine that IP contact center agent 194, corresponding to the selected type of contact center agent, is available and may send a SIP INVITE message to IP contact center agent 194 (signal 1412). IP contact center agent 194 may not be provided with an agent interface. When IP contact center agent 194 determined that the call is to be transferred to another contact center agent (e.g., based on a conversation with the user of IP caller 112), IP contact center agent 194 may send a transfer request to contact center services system 190. The transfer request may be made, for example, using an interface associated with contact center services system 190. As another example, IP contact center agent 194 may use a VoIP application to dial a number associated with a selected contact center agent.

Contact center services system 190 may determine that the selected contact center agent, to which the call is to be transferred, corresponds to WebRTC contact center agent 192. In response, contact center services system 190 may request an agent URI from customer web server 130 via WebRTC backend system 180 and WebRTC access server 140 (signals 1418, 1420, and 1422). Alternatively, IP contact center agent 194 may select a contact center agent type and contact center services system 190 may request an agent URI for an agent of the selected contact center agent type and customer web server 130 may select WebRTC contact center agent 192.

Customer web server 130 may provide the URI, associated with WebRTC contact center agent 192, to contact center services system 190 via WebRTC access server 140 and WebRTC backend system 180 (signals 1424, 1426, and 1428). Contact center services system 190 may use the received contact center agent URI to establish a WebRTC call connection to WebRTC contact center agent 192 (signal 1430). A WebRTC call connection may now be established between contact center services system 190 and WebRTC contact center agent 192.

After connecting to WebRTC contact center agent 192, contact center services system 190 may report the connection to customer web server 130 via WebRTC backend system 180 and WebRTC access server 140 (signals 1432, 1434, and 1436). In response to receiving the message reporting the connection to WebRTC contact center agent 192, customer web server 130 may provide an agent interface to WebRTC contact center agent 192 (signal 1438).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7-9, the order of the blocks may be modified in other implementations. Further, non-dependent blocks may be performed in parallel. As another example, while a series of signal flows have been described with respect to FIGS. 11, 12A, 12B, 13A, 13B, and 14, the order of the signal flows may be modified in other implementations. Further, non-dependent signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, by a computer device, a control actions application programming interface (API) from a Web Real-Time Communication backend device configured to provide control actions for Web Real-Time Communication calls to a contact center services system, wherein the Web Real-Time Communication backend device and the contact center services system are located in a private network;
    providing, by the computer device, a first agent interface to a first contact center agent device handling a Web Real-Time Communication call, wherein the first agent interface includes a transfer call selection object;
    receiving, by the computer device, a transfer request from the first contact center agent device via the transfer call selection object, wherein the transfer request includes a Uniform Resource Identifier (URI) associated with the Web Real-Time Communication call;
    sending, by the computer device, an instruction using the received control actions API, to the Web Real-Time Communication backend device, to transfer the Web Real-Time Communication call to a second contact center agent device, wherein the instruction includes the URI and is sent via a Web Real-Time Communication access device configured to communicate with the Web Real-Time Communication backend device, and wherein the computer device is located outside the private network;
    forwarding, by the Web Real-Time Communication backend device, the instruction to the contact center services system;
    connecting, by the contact center services system, the Web Real-Time Communication call to the second contact center agent device using a Web Real-Time Communication Application Programming Interface (API), a Voice over Internet Protocol (VoIP) connection, or a Time Division Multiplexing (TDM) connection, in response to receiving the instruction and based on the URI;
    receiving, by the computer device, from the contact center services system and via the Web Real-Time Communication backend device, an indication that a connection has been made with the second contact center agent device, wherein the indication includes the URI associated with the Web Real-Time Communication call; and
    providing, by the computer device, a second agent interface to the second contact center agent device, in response to receiving the indication that the connection has been made with the second contact center agent device.

2. The method of claim 1, wherein the first agent interface includes one or more of:
    information relating to a caller associated with the Web Real-Time Communication call;
    information relating to a reason for the Web Real-Time Communication call;
    information relating to statistics associated with the Web Real-Time Communication call; or
    information relating to transfer options available to a first contact center agent associated with the first contact center agent device.

3. The method of claim 2, wherein the transfer options available to the first contact center agent include:
    an option to select a type of transfer;
    an option to select a type of contact center agent; or
    an option to select a particular contact center agent.

4. The method of claim 1, wherein the transfer request includes one or more of:
    call context information associated with the Web Real-Time Communication call;
    information identifying a first contact center agent associated with the first contact center agent device;
    information identifying a second contact center agent associated with the second contact center agent device;
    information identifying a type of agent being requested;
    information identifying a transfer type associated with the transfer request; or
    information identifying an endpoint type associated with the second contact center agent device.

5. The method of claim 1, wherein the first contact center agent device is communicating with the contact center services system via a first Web Real-Time Communication connection and wherein the second contact center agent device is communicating with the contact center services system via a second Web Real-Time Communication connection.

6. The method of claim 1, wherein the first contact center agent device is communicating with the contact center services system via a Web Real-Time Communication connection and wherein the second contact center agent device is communicating with the contact center services system via either a Voice over Internet Protocol connection or a Time Division Multiplexing connection.

7. The method of claim 1, wherein the first contact center agent device is communicating with the contact center services system via either a Voice over Internet Protocol connection or a Time Division Multiplexing connection and wherein the second contact center agent device is communicating with the contact center services system via a Web Real-Time Communication connection.

8. A system comprising:
    a first processor configured to:
        receive a control actions application programming interface (API) from a Web Real-Time Communication backend device configured to provide control actions for Web Real-Time Communication calls to a contact center services system, wherein the Web Real-Time Communication backend device and the contact center services system are located in a private network;
        provide a first agent interface to a first contact center agent device handling a Web Real-Time Communication call, wherein the first agent interface includes a transfer call selection object;
receive a transfer request from the first contact center agent device via the transfer call selection object, wherein the transfer request includes a Uniform Resource Identifier (URI) associated with the Web Real-Time Communication call;
send an instruction using the received control actions API, to the Web Real-Time Communication backend device, to transfer the Web Real-Time Communication call to a second contact center agent device, wherein the instruction includes the URI and is sent via a Web Real-Time Communication access device configured to communicate with the Web Real-Time Communication backend device, and wherein the computer device is located outside the private network;
receive, from the contact center services system and via the Web Real-Time Communication access device, an indication that a connection has been made with the second contact center agent device, wherein the indication includes the URI associated with the Web Real-Time Communication call; and
provide a second agent interface to the second contact center agent device, in response to receiving the indication that the connection has been made with the second contact center agent device;
a second processor, associated with the Web Real-Time Communication backend device, configured to:
forward the instruction to the contact center services system; and
a third processor, associated with the contact center services system, configured to:
connect the Web Real-Time Communication call to the second contact center agent device using a Web Real-Time Communication Application Programming Interface (API), a Voice over Internet Protocol (VoIP) connection, or a Time Division Multiplexing (TDM) connection, in response to receiving the instruction and based on the URI.

9. The system of claim 8, wherein the first agent interface includes one or more of:
information relating to a caller associated with the Web Real-Time Communication call;
information relating to a reason for the Web Real-Time Communication call;
information relating to statistics associated with the Web Real-Time Communication call; or
information relating to transfer options available to a first contact center agent associated with the first contact center agent device.

10. The system of claim 8, wherein the transfer request includes one or more of:
call context information associated with the Web Real-Time Communication call;
information identifying a first contact center agent associated with the first contact center agent device;
information identifying a second contact center agent associated with the second contact center agent device;
information identifying a type of agent being requested;
information identifying a transfer type associated with the transfer request; or
information identifying an endpoint type associated with the second contact center agent device.

11. The system of claim 8, wherein the first contact center agent device is communicating with the contact center services system via a first Web Real-Time Communication connection and wherein the second contact center agent device is communicating with the contact center services system via a second Web Real-Time Communication connection.

12. The system of claim 8, wherein the first contact center agent device is communicating with the contact center services system via a Web Real-Time Communication connection and wherein the second contact center agent device is communicating with the contact center services system via either a Voice over Internet Protocol connection or a Time Division Multiplexing connection.

13. The system of claim 8, wherein the first contact center agent device is communicating with the contact center services system via either a Voice over Internet Protocol connection or a Time Division Multiplexing connection and wherein the second contact center agent device is communicating with the contact center services system via a Web Real-Time Communication connection.

14. A system comprising:
a contact center services system, located in a private network, configured to:
connect a Web Real-Time Communication call to a first contact center agent device;
a Web Real-Time Communication backend device, located in the private network, configured to:
provide control actions for Web Real-Time Communication calls to the contact center services system;
a Web Real-Time Communication access device configured to:
communicate with the Web Real-Time Communication backend system; and
a web site hosting device, located outside the private network, configured to:
receive a control actions application programming interface (API) from the Web Real-Time Communication backend device;
provide a first interface to the first contact center agent device, wherein the first interface includes a transfer call selection object;
receive a transfer request from the first contact center agent device via the transfer call selection object, wherein the transfer request includes a Uniform Resource Identifier (URI) associated with the Web Real-Time Communication call; and
send an instruction using the received control actions API, wherein the instruction includes the URI, to the Web Real-Time Communication backend device via the Web Real-Time Communication access device, to transfer the Web Real-Time Communication call to a second contact center agent device, in response to receiving the transfer request;
wherein the Web Real-Time Communication backend device is configured to:
forward the instruction to the contact center services system;
wherein the contact center services system is further configured to:
connect the Web Real-Time Communication call with the second contact center agent device using a Web Real-Time Communication Application Programming Interface (API), a Voice over Internet Protocol (VoIP) connection, or a Time Division Multiplexing (TDM) connection, in response to the received instruction and based on the URI; and
provide, to the web site hosting device and via the Web Real-Time Communication access device and the Web Real-Time Communication backend device, an indication that the connection with the second contact center agent device has been made; and wherein the web site hosting device is further configured to:

provide a second interface to the second contact center agent device, in response to receiving the indication that the connection has been made with the second contact center agent device.

15. The system of claim 14, wherein the Web Real-Time Communication access device is further configured to:

forward the received instruction to the contact center services system via the Web Real-Time Communication backend system located in the private network.

16. The system of claim 14, wherein the Web Real-Time Communication backend device is configured to:

receive the indication, that the connection with the second contact center agent device has been made, from the contact center services system; and forward the received indication to the Web Real-Time Communication access device.

17. The system of claim 14, wherein the first interface includes one or more of:

information relating to a caller associated with the Web Real-Time Communication call;

information relating to a reason for the Web Real-Time Communication call;

information relating to statistics associated with the Web Real-Time Communication call; or information relating to transfer options available to a first contact center agent associated with the first contact center agent device.

18. The system of claim 14, wherein the transfer request includes one or more of:

call context information associated with the Web Real-Time Communication call;

information identifying a first contact center agent associated with the first contact center agent device;

information identifying a second contact center agent associated with the second contact center agent device;

information identifying a type of agent being requested;

information identifying a transfer type associated with the transfer request; or information identifying an endpoint type associated with the second contact center agent device.

* * * * *